(12) United States Patent
Motavalli et al.

(10) Patent No.: US 8,594,897 B2
(45) Date of Patent: Nov. 26, 2013

(54) VARIABLE PRODUCT AGROCHEMICALS APPLICATION MANAGEMENT

(75) Inventors: Peter P. Motavalli, Columbia, MO (US); Kelly A. Nelson, Novelty, MO (US)

(73) Assignee: The Curators of the University of Missouri, Columbia, MO (US)

( * ) Notice: Subject to any disclaimer, the term of this patent is extended or adjusted under 35 U.S.C. 154(b) by 353 days.

(21) Appl. No.: 13/027,435

(22) Filed: Feb. 15, 2011

(65) Prior Publication Data

US 2012/0083907 A1 Apr. 5, 2012

Related U.S. Application Data

(60) Provisional application No. 61/388,414, filed on Sep. 30, 2010.

(51) Int. Cl.
*G06F 7/00* (2006.01)
(52) U.S. Cl.
USPC .................................. 701/50; 702/2; 111/200
(58) Field of Classification Search
USPC ..................... 701/50; 702/1, 2; 705/4; 239/1; 111/200, 900
See application file for complete search history.

(56) References Cited

U.S. PATENT DOCUMENTS

| | | | |
|---|---|---|---|
| 4,630,773 A | 12/1986 | Ortlip | |
| 5,668,719 A | 9/1997 | Bobrov et al. | |
| 5,768,128 A | 6/1998 | Thompson et al. | |
| 5,878,371 A | 3/1999 | Hale et al. | |
| 6,058,351 A | 5/2000 | McCauley | |
| 6,549,852 B2 | 4/2003 | Hanson | |
| 6,597,992 B2 | 7/2003 | Rooney et al. | |
| 6,889,620 B2 | 5/2005 | Fraisse et al. | |
| 2006/0015253 A1 | 1/2006 | Ochs et al. | |
| 2007/0050116 A1 | 3/2007 | Jernigan | |

OTHER PUBLICATIONS

Motavalli, P., K. Nelson, S. Anderson, and P. Tracy. 2009. Delineation of high risk field areas for variable source N fertilizer applications to optimize crop N use efficiency. pp. 40-49. In J. Slater (ed.) Missouri Soil Fertility and Fertilizers Research Update, 2008 Agronomy Misc. Publ. #09-01, University of Missouri, Columbia, MO. http://aes.missouri.edu/pfcs/research/prop08.pdf.

Motavalli, P., K. Nelson, N. Kitchen, S. Anderson, and D.K. Ludwig. 2008. Development of a variable source N fertilizer management strategy using enhanced efficiency N fertilizer sources to optimize crop N response and economic returns. Agron. Abstr., American Society of Agronomy, Madison, WI. [non-paginated CD-ROM].

Noellsch, A.J., P.P. Motavalli, K.A. Nelson, and N.R. Kitchen. 2009. Corn response to conventional and slow-release nitrogen fertilizers across a claypan landscape. Agron. J. 101:607-614. http://www.ars.usda.gov/research/publications/publications.htm?SEQ_NO_115=230790.

(Continued)

*Primary Examiner* — Christopher J Novosad
(74) *Attorney, Agent, or Firm* — Shook Hardy & Bacon L.L.P.

(57) ABSTRACT

Methods and products are provided for facilitating application of variable-product agrochemicals, such as fertilizer, to an application area, such as a field. The fertilizer or agrochemical may include a single fertilizer or agrochemical type or a mixture. In one embodiment, a fertilizer-application area is divided into application cells, and a fertilizer product is determined for each cell, based on zones of the application area with a similar characteristic, such as topographic wetness index levels. Based on a determined product for each cell, instructions for controlling an agrochemical applicator are automatically generated.

20 Claims, 15 Drawing Sheets

(56) References Cited

OTHER PUBLICATIONS

Motavalli, P., K. Nelson, and S. Anderson. 2008. Delineation of high risk field areas for variable source N fertilizer applications to optimize crop N use efficiency. pp. 59-64. In J. Slater (ed.) Missouri Soil Fertility and Fertilizers Research Update, 2007 Agronomy Misc. Publ. #08-01, University of Missouri, Columbia, MO. http://aes.missouri.edu/pfcs/research/prop07.pdf.

Noellsch, A.J., P. P. Motavalli, K.A. Nelson, N. Kitchen, S.H. Anderson, P. Scharf, and P. Tracy. 2007. Optimizing crop N use efficiency using a variable source N fertilizer application strategy. Agron. Abstr., American Society of Agronomy, Madison, WI. [non-paginated CD-ROM].

Motavalli, P., K. Nelson, N. Kitchen, S. Anderson, and P. Scharf. 2007. Variable source N fertilizer applications to optimize crop N use efficiency. pp. 35-43. In J. Slater (ed.) Missouri Soil Fertility and Fertilizers Research Update, 2006 Agronomy Misc. Publ. #07-01, University of Missouri, Columbia, MO. http://aes.missouri.edu/pfcs/research/prop06.pdf.

Motavalli, P., K. Nelson, N. Kitchen, S. Anderson, and P. Scharf. 2006. Variable source N fertilizer applications to optimize crop N use efficiency. pp. 56-62. In J. Slater (ed.) Missouri Soil Fertility and Fertilizers Research Update, 2005 Agronomy Misc. Publ. #06-01, University of Missouri, Columbia, MO. http://aes.missouri.edu/pfcs/research/prop05.pdf.

Motavalli, P., K. Nelson, N. Kitchen, S. H. Anderson, P. Scharf, and P. Tracy. 2005. Variable source N fertilizer applications to optimize crop N use efficiency. Agron. Abstr., American Society of Agronomy, Madison, WI.[non-paginated CD-ROM].

Motavalli, P., K. Nelson, and C. Barnett. 2009. Development of a Software Management Tool for Variable Source Fertilizer Application (Budget); Sponsored Research Contract—The Curators of the University of Missouri 2010., 17 pages.

Motavalli, P. P., Goyne, K. W., and Udawatta, R. P. 2008. Environmental impacts of enhanced-efficiency nitrogen fertilizers. Online. Crop Management doi:10.1094/CM-2008-0730-02-RV.

Nelson, K. A., Scharf, P. C., Bundy, L. G., and Tracy, P. 2008. Agricultural management of enhanced-efficiency fertilizers in the north-central United States. Online. Crop Management doi:10.1094/CM-2008-0730-03-RV.

Motavalli, P.P., R.P. Udawatta, K.W. Goyne, and K.A. Nelson. 2006. Environmental issues related to nitrogen management practices in the United States. International Symposium on Nitrogen Behavior and Effective Management in Agro-Ecosystems, Sep. 21, 2006. National Institute of Agricultural Science and Technology, Rural Development Administration, Republic of Korea.

International Search Report mailed Feb. 21, 2012 in PCT Application PCT/US2011/054031, Filed Sep. 29, 2011; 29 pages.

(DETERMINE ATTRIBUTE VALUES)

(PARTITION APPLICATION AREA INTO APPLICATION CELLS)

(DETERMINE FERTILIZER PRODUCT FOR CELLS)

VARIABLE PRODUCT AGROCHEMICALS APPLICATION MANAGEMENT

CROSS-REFERENCE TO RELATED APPLICATIONS

This application claims the benefit of priority of U.S. Provisional Application No. 61/388,414, filed Sep. 30, 2010, which is expressly incorporated by reference herein in its entirety.

STATEMENT REGARDING FEDERALLY SPONSORED RESEARCH OR DEVELOPMENT

Not applicable.

SUMMARY

Embodiments of our technology are defined by the claims below, not this summary. A high-level overview of various aspects of our technology are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, ways to assist a grower in developing and implementing strategies for agrochemical application.

In brief, embodiments of the technologies described herein provide ways to facilitate variable-product agrochemicals application. In one embodiment, a field (or area of land) is delineated and mapped into zones of ground, that are suitable for receiving a certain agrochemical, based on characteristics of the ground within the zones. For example, the agrochemical might be a fertilizer and the zones might represent areas of the field that are vulnerable to fertilizer loss due to soil characteristics. Using information about the delineated zones, appropriate mixture ratios or rates of fertilizer to be applied to areas of the field are determined. For example, areas within zones of land susceptible to fertilizer loss might be determined to receive specially adapted or enhanced efficiency fertilizer, while areas within zones of ground that are not susceptible to fertilizer loss might be determined to receive a conventional fertilizer. The determined fertilizer application sources, mixture ratios, and rates, which we refer to as the "fertilizer product," can be presented as a schedule or listing or visually as a geographically referenced map of the field, showing which areas of the field are to receive the determined fertilizer products. This map, or other information representing the determined fertilizer products can also be transferred in an appropriate form to a controller of a fertilizer applicator, thereby enabling fertilizer to be applied to the field consistent with the determined ratios and rates of the fertilizer products. Additionally, the map, or other information representing the determined fertilizer products, may be stored for record keeping or used for reporting, evaluating application strategies, or other analysis. For example, the map may be used as an overlay onto a map showing crop yields within the field.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1A:
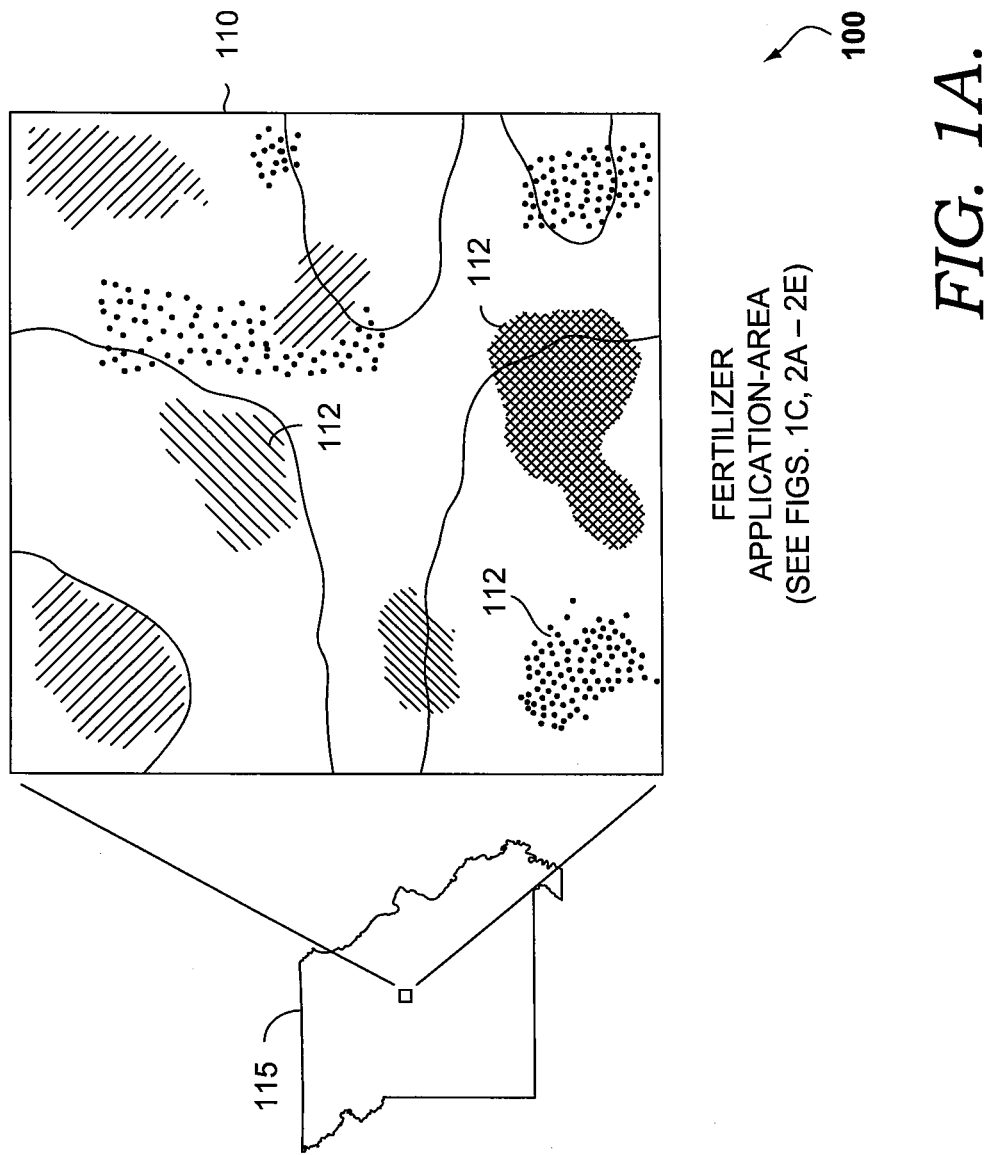
FIGS. 1A and 1B depict aspects of an illustrative operating environment suitable for practicing an embodiment of our technology.

The subject matter of the present technology is described with specificity herein to meet statutory requirements. However, the description itself is not intended to define the technology, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Acronyms and Shorthand Notations

Throughout the description of the present invention, several acronyms, shorthand notations, and terms are used to aid the understanding of certain concepts pertaining to the associated system and services. These acronyms, shorthand notations, and terms are solely intended for the purpose of providing an easy methodology of communicating the ideas expressed herein and are in no way meant to limit the scope of the present invention. The table below does not include a full definition. A full definition of any term can only be gleaned by giving consideration to the full breadth of this patent.

Sometimes, we use different terms to refer to similar or the same things. We do not necessarily mean to implicate a difference, per se; but are constrained by certain statutory requirements that apply to patents and patent applications. For example, claims must use proper antecedent basis. Sometimes satisfying that rule can lead to wordiness, whereas using a different word helps make referring to prior terms easier. Thus we might use different words in that regard. The following is a list of these terms:

TABLE 1

| | |
|---|---|
| DEM | Digital Elevation Model |
| TWI | Topographic Wetness Index |
| Agrochemical | A substance able to be applied to an application area, and which may be solid, liquid, gaseous, or a combination of one or more solid, liquid, or gaseous substances including, for example, fertilizers, herbicides, pesticides, other crop protection chemicals, erosion control or other surface control substances, conditioners, nutrients, minerals, neutralizers, soil additives, amendments, or similar substances. |
| Fertilizer, Fertilizer Source | A type of agrochemical for application to an application area. It is contemplated that in some embodiments, the term "fertilizer" includes any agrochemical of combination of agrochemicals. |
| Application Area | An area of land suitable for receiving an application of an agrochemical, and which might include one or more fields, pastures, orchards, courts, golf courses, yards, lawns, planting or cultivating beds, lots, or similar areas of land, or a portion of such an area. |
| Discrete Land Unit | A discrete portion of land located within an application area associated with one or more attribute values. |
| Location Point | A location in an application area that has an associated attribute value corresponding to a degree of expression of an attribute at that location. For example, location points may represent locations in an application area corresponding to measurements of an attribute, such as soil pH-level measurements, vegetation, soil structure, or other attributes, and may be uniformly spatially distributed or located wherever attribute data, such as field measurements of attributes, are available. They may be more densely located around areas where an attribute has a greater variance and may be more spread apart in areas where the attribute varies less. |
| Attribute Value | An attribute value corresponds to a degree of expression of an attribute present at a location point or within a discrete land unit of an application area. An attribute value may be expressed as numerical quantity (e.g., "6" or "20%") or as a classification (e.g. "acidic" or "sandy"), and may be derived from a measurement of an attribute at a single point within a discrete land unit or may be an average, median, or similar representative value of the degree of expression of an attribute possessed by a discrete land unit. An attribute value also may be represented as an index value, which corresponds to an index that represents degrees of expression of an attribute. A set of attribute values, corresponding to a plurality of discrete land units or location points in an application area, may be characterized or represented as an attribute grid, with each point on the grid corresponding to a location of a discrete land unit or location point having an associated attribute value. |
| Attribute Zone | An area of land in an application area that has similar attribute values. For example, in one embodiment, zones are made up of substantially contiguous discrete land units having substantially similar attribute values or having attribute values corresponding to the same attribute classification, such as "acid" or "alkaline. |
| Application-Area Information | Application-area information includes attribute information corresponding to characteristics of the application area. In some embodiments this includes attribute values that are geographically referenced within the application-area or associated with location information. Application-area information may further include other geographic information of application area such as its geographic location, proximity to streams, roads, wetlands, or similar features. Application-area information can, in some embodiments, also comprise one or more sets of measured or determinable values of a characteristic or attribute at locations in an application area. For example, for the attribute of soil acidity or alkalinity, application-area information might include a set of attribute values representing the location and measured soil pH-levels of various location points in the application area. |
| Fertilizer Product, Agrochemical product | A determined fertilizer or agrochemical application for an application cell. A fertilizer (or agrochemical) product can include the source(s) or type(s) of fertilizer, and can also include the quantity or volume of fertilizer, application rate, and fertilizer-mixture information such as a proportion of mixed fertilizer types. In one embodiment, a fertilizer product is determined for each application cell in an application area. A fertilizer product, or a set of fertilizer products for multiple application cells, may be formatted as a schedule showing application levels, rates, mixture ratios, quantities, total amounts, or sources. |
| Application Cell | A portion of ground that will receive a certain product of fertilizer. The boundaries of an application cell may be determined by the physical reach or other limitations of a fertilizer applicator, user preferences, or by other application parameters, in one embodiment. |
| Application Strip | A row of partitioned application cells of uniform width. An application strip represents an area of ground covered by a single pass of a fertilizer applicator. By way of example, applying fertilizer to an application area may be accomplished by a series of back-and-forth passes over the application area, to ensure the entire application area receives fertilizer. |
| Fertilizer-Application Parameters | Parameters, which in some embodiments are used, along with the application-area information to determine the fertilizer-application information, which will be used for apply fertilizer to each application cell. Fertilizer-application parameters comprise information such as (1) indications of fertilizer-applicator equipment which might affect the application cell size; (2) user application preferences such as a risk-avoidance level for known risk areas, fertilizer-application products, preferred fertilizer types, user-specified buffer areas, and application-cell size (3) available fertilizer types; (4) rates and ratios of fertilizer types to apply for given application-area characteristics; (5) attribute thresholds or index thresholds; (6) information about the type of crop that will be grown in the application cell; (7) historical data such as previous parameters, previous application rates and ratios, and past crop yields; (8) economic parameters such as the cost of the fertilizer or cost-benefit analyses of the cost for applying a particular fertilizer to an application cell verses the expected gain from an improved crop-yield from that cell; (9) government regulations (which, for example, might limit the amount or location of certain types of fertilizer sources that can be applied); and (10) local geographic information (such as a nearby stream or wetlands that might affect which fertilizer is to be applied to adjacent application cells. |
| Equipment Parameters | Equipment parameters are a subset of fertilizer-application parameters and include parameters relating to the fertilizer-applicator equipment and other parameters affecting the physical limitations of applying fertilizer. For example, equipment parameters may include the reach or coverage-area of an applicator for given types of fertilizer or information which can be used to determine an applicator's reach or coverage-width, such as a model number of a fertilizer applicator. |
| Fertilizer-Application Information | Information including the results of the process for determining a fertilizer product to apply to an application cell based on application-area information and, in one embodiment, fertilizer-application parameters. Fertilizer-application information can include information specifying a |

TABLE 1-continued

| | |
|---|---|
| | product of fertilizer to apply in an application cell such as the source(s) or type(s) of fertilizer, the quantity of fertilizer, application rate, and fertilizer-mixture information such as a proportion of mixed fertilizer types. In one embodiment, fertilizer-application information also specifies location information for the application cell; in one embodiment it also includes other information such as the results of additional analysis performed using fertilizer application information. |
| Fertilizer Product, Agrochemical product | A determined fertilizer or agrochemical application for an application cell. A fertilizer (or agrochemical) product can include the source(s) or type(s) of fertilizer, and can also include the quantity or volume of fertilizer, application rate, and fertilizer-mixture information such as a proportion of mixed fertilizer types. In one embodiment, a fertilizer product is determined for each application cell in an application area. A fertilizer product, or a set of fertilizer products for multiple application cells, may be formatted as a schedule showing application levels, rates, mixture rations, quantities, total amounts, or sources. |
| Fertilizer Application Schedule | A collection of information specifying fertilizer-application information, including the determined fertilizer (or agrochemical) product to be applied for each application cell, of a set of application cells, in an application area. The schedule can include, in one embodiment, information specifying for each application cell, a product of fertilizer to apply, or a quantity and fertilizer type or types, rate and a mixture ratio, if a mixture of fertilizer types is to be applied. |
| Attribute Threshold | An Attribute Threshold or attribute-value threshold is used to determine fertilizer product to be applied based on attribute value(s) of zones within application cells. For example, Topographic Wetness Index ("TWI") attribute values that do not exceed a given TWI threshold might be ignored, thus preventing these lower levels from determining fertilizer-application rates and ratios. An attribute threshold or characteristic-threshold might also be in the form of multiple thresholds, forming a bracket or range of characteristic values, such as considering only attribute values falling below a first value and above a second value. |
| Risk-Avoidance Level | A risk-avoidance level is a fertilizer-application parameter which is useable to scale or adjust fertilizer product application. In one embodiment, a risk avoidance level is used to adjust a corresponding attribute threshold. |

Our technology may be embodied as, among other things: a method, system, or set of instructions embodied on one or more computer-readable media. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Illustrative uses of our technology, as will be greatly expanded upon below, might be, for example, to automate and facilitate decision making and actions undertaken by a person in the selection and application of fertilizer. For example, using our technology, a grower would be empowered to quickly identify vulnerable portions of a fertilizer-application area, such as a field, and readily determine a precise fertilizer-application strategy for addressing these vulnerabilities. In another example using our technology, a grower would be empowered to automatically selectively apply specialized fertilizer on a portion of an application area and apply less expensive conventional fertilizers for another portion of the field. In another example using our technology, a grower is empowered to quickly determine a fertilizer-application strategy based on the expected economic benefit derived from applying one fertilizer type verses another type over small portions of a field and automatically apply fertilizer according to the strategy. In another example using our technology, a grower would be empowered to automatically control application of fertilizer by a fertilizer-applicator, based on soil characteristics of the application area, grower-selection of fertilizer-application strategies, or other parameters. In another example using our technology, a grower would be empowered to purchase or prepare only the quantities of specialty fertilizers that are needed, and apply those specialty fertilizers only at locations where it would be helpful. In another example using our technology, a grower would be empowered to view a table or map of recommended fertilizer-application dosages, geographically referenced to locations in a field. The table or map might further assist in decision making and planning by including past fertilizer-application information, information about past crop-yields, or characteristics of the field. Our technologies would also empower a fertilizer-retailer to provide a customer with a fertilizer-application strategy customized to the customer's needs or application location. Our technology can also provide increased fertilizer-use efficiency and decreased environmental fertilizer loss, facilitate compliance with government regulations, or facilitate record-keeping of geographically referenced records of fertilizer-application history. These examples illustrate only various aspects of using our technology and are not intended to define or limit our technology.

The claims are drawn to instructions embodied on computer readable media for facilitating a method of ultimately applying variable-products of agrochemicals, such as a fertilizer, to a fertilizer-application area ("application area"), such as a field. The fertilizer sources or types can include conventional fertilizer (such as urea), enhanced-efficiency fertilizer (such as a fertilizer adapted for minimizing release wet areas), and other fertilizer sources. Enhanced-efficiency fertilizer ("enhanced fertilizer") includes slow-release fertilizer, fertilizer having properties to minimize release in wet areas, resist or impede environmental loss, and other specialty fertilizer. Examples of enhanced fertilizer include ESN® by Agrium, Inc., Agrotain® by Agrotain International, Inc, NFusion® by Georgia-Pacific, and N-Serve® by Dow Agro-Sciences. Examples of conventional fertilizers include urea, manure, and chemical salts such as potassium nitrate, calcium phosphate, or ammonium sulfate. It is also contemplated, that in some embodiments fertilizer sources might include agrochemicals such as crop protection chemicals such as herbicides, pesticides, erosion control or other surface control substances, conditioners, nutrients, minerals, neutralizers, soil additives, amendments, or any other solid, liquid, or gaseous, or combination of solid, liquid, or gaseous substances which may be applied to an application area.

Some embodiments of the present invention determine a fertilizer and quantity of the fertilizer to be applied to discrete portions or cells of an application area, based on characteristics of the application area and fertilizer-application parameters. The fertilizer might include a single fertilizer type or a mixture of fertilizer types. The term "single fertilizer type" is not intended to convey a homogeneous substance, necessarily, but rather a single fertilizer source. For example UAN (urea ammonium nitrate) would be considered a single fertilizer type, although it is made up of urea, ammonium nitrate, and water. A mixture of fertilizer types includes a mixture of single-fertilizer types, such as a combination of different conventional types or enhanced types or a combination of conventional and enhanced fertilizer types.

At a high level in one embodiment, the method starts with determining attribute values that are associated with land or soil characteristics in an application area. Based on these attribute values and various agrochemical-application parameters ("application parameters"), the application area is divided into a number of application cells, which are portions of land that will receive a certain product of fertilizer.

The boundaries of an application cell (or at least its width) are determined by the physical reach or other limitations of a fertilizer applicator (such as a multi-bin spreader), user preferences, and by other application parameters, in one embodiment. The fertilizer-application parameters are also used, along with the application-area attribute values to determine the fertilizer-application information, which will be used to apply fertilizer to each cell. Fertilizer-application information includes an identification of type or types of fertilizer to apply to a cell, a rate and/or quantity of each fertilizer type to apply, and a ratio of fertilizer types to apply (when multiple types are to be used).

The fertilizer-application parameters include items such as: (1) indications of fertilizer-applicator equipment (e.g., the type of applicator, which fertilizer sources and how many fertilizer sources it can apply), its application reach (which affects the application cell size); (2) user application preferences including application rates and ratios, which in one embodiment are specified as a quantity per unit land area (e.g., 200 lbs/acre), risk-avoidance level, which is useable to scale or adjust fertilizer application rates, and other preferences, (3) available types of fertilizer; (4) rates and ratios of fertilizer types to apply for given application-area characteristics, which may also include rates if conventional fertilizer were to be used or rates if enhanced efficiency fertilizer were used; (5) attribute thresholds (explained below); (6) the type of crop that will be grown in the application cell; (7) historical data such as previous parameters, previous application rates/ratios, and past crop yields; (8) economic parameters such as the cost of the fertilizer or cost-benefit analyses of the cost for applying a particular fertilizer to an application cell verses the expected gain from an improved crop-yield from that cell; (9) government regulations (which might limit the amount or location of certain types of fertilizer sources that can be applied); and (10) geographic information (such as a nearby stream or wetlands that might affect which fertilizer is to be applied to adjacent application cells.

The attribute thresholds are used to determine which fertilizer type to apply based on the attribute value or index value. For example, Topographic Wetness Index ("TWI") values that do not exceed a given TWI threshold might be ignored, thus preventing these lower levels from determining fertilizer-application rates and ratios. An attribute threshold or characteristic-threshold might also be in the form of multiple thresholds, forming a bracket or range of characteristic values, such as considering only attribute values falling below a first value and above a second value.

The determined fertilizer-application information can be represented as an association or mapping (such as a geographic map or a table) of application cells that are associated with information about: (1) what fertilizer type(s) to apply, (2) the quantity of fertilizer to apply, and (3) the ratio of fertilizer types to each other when a mixture of fertilizers is desired. This information can be formatted automatically for use by a controller of a fertilizer applicator and may be presented to a user as a visual representation, such as a table or geographically referenced map of the application area.

In one embodiment, the application-area characteristics are characterized as attribute values per discrete portions of land in the application area. In another embodiment, application-area characteristics are characterized as attribute values at a plurality of location points in an application area with each location point having an associated attribute value. In another embodiment, the application-area characteristics are characterized as attribute values per portions of a grid that logically overlays the application area. The values can also be associated with the indices of the grid, where an index represents a location point in an application area. For example, a soil pH-index could indicate soil pH-values at location points throughout an application area. Another exemplary index is the Topographic Wetness Index (TWI), which indicates a likelihood for accumulation of water at a given location point or within a given discrete unit of land within the application area. The TWI can be a factor in deciding where to apply a type of fertilizer; e.g., an enhanced fertilizer verses a conventional fertilizer based on the likelihood that a conventional fertilizer will be more susceptible to environmental loss if it is applied to a given application cell.

At a lower level in one embodiment, the method first determines at least one attribute-index or set of attribute values over an application area and then delineates zones based on similar attribute or index values or attribute values (or index values) within the same class or range. For example, contiguous areas having similar TWI values or TWI values falling within the same range will be delineated as one zone. An attribute zone might fall entirely within an application cell or might span multiple cells.

The system logically partitions the application area into application cells based on fertilizer-application parameters including applicator-equipment parameters, user preferences, and the size of the application area, and the location of the zones, in one embodiment. Each cell encompasses at least part of at least one zone, thereby associating information about that zone and its attribute values with the cell. For example, a given cell might include part of a zone having a high TWI value and part of a zone having a low TWI value. In one embodiment, the output of the partitioning step yields the application cells (including their size and location), information about the attribute zones within each application cell, and any fertilizer-application parameters relevant to the application cells.

Fertilizer-application information, which includes the type (s), rate, and ratios of fertilizer to be applied, for each application cell is also determined. As mentioned, the output of the partitioning step includes the size and location of the application cells, and, for each cell, information about the attribute zones within that cell and may also include fertilizer-application parameters relevant to that cell, in one embodiment. Thus, the output of the partitioning step provides the input for the step of determining the fertilizer-application information. Specifically, the fertilizer-application information is determined, for each cell, based on (1) the fertilizer-application parameters relevant to that cell and (2) information related to the zones within that cell. By way of example, if a given application cell contained only one attribute zone, which had a high TWI value, then the fertilizer-application information for that cell would specify that it should receive an enhanced fertilizer (unless other application parameters specified otherwise).

The fertilizer-application information might indicate that only one fertilizer source is to be applied to an entire cell. Alternatively, a mixture should be applied. The decision to apply a mixture is determined by an application parameter known as a mixed-types indicator. This is a parameter that specifies whether or not to use a mixed ratio of fertilizer types in an application cell. If the mixed-types indicator specifies that a mixed ratio of types can be applied where necessary, then the decision of whether to use a mixture and the specific mixture ratio are determined based on the attribute zones within the application cell and the proportion of area of the application cell that each zone occupies, in one embodiment. Thus, for example, assume that a cell includes two zones: one zone that has a low TWI value and occupies 60% of the application-cell area, and another that has a high TWI value and occupies the remaining 40% of the application-cell area. If the mixed-types indicator indicates that using a mixture is permissible, then a mixture of fertilizer types will be used in one embodiment because two zones having different characteristics are within the application cell. Furthermore, in one embodiment the mixture ratio of fertilizer types to apply is determined based on the proportional areas occupied by each zone. Here, the ratio might be 60% conventional fertilizer to 40% enhanced fertilizer.

On the other hand, if the mixed-types indicator indicates that only a single type is to be applied, then in one embodiment, a determination of which type to apply must be performed. This determination could be based on the attribute value of the zone occupying the greatest area within the application cell. So, in the above example where 60% of the application cell includes a zone having a low TWI value, the decision of which source to apply would be based on that zone's characteristic. Since it is characterized as having a low TWI value, a conventional fertilizer type would be applied (unless other application parameters dictated otherwise).

Figure 1B:
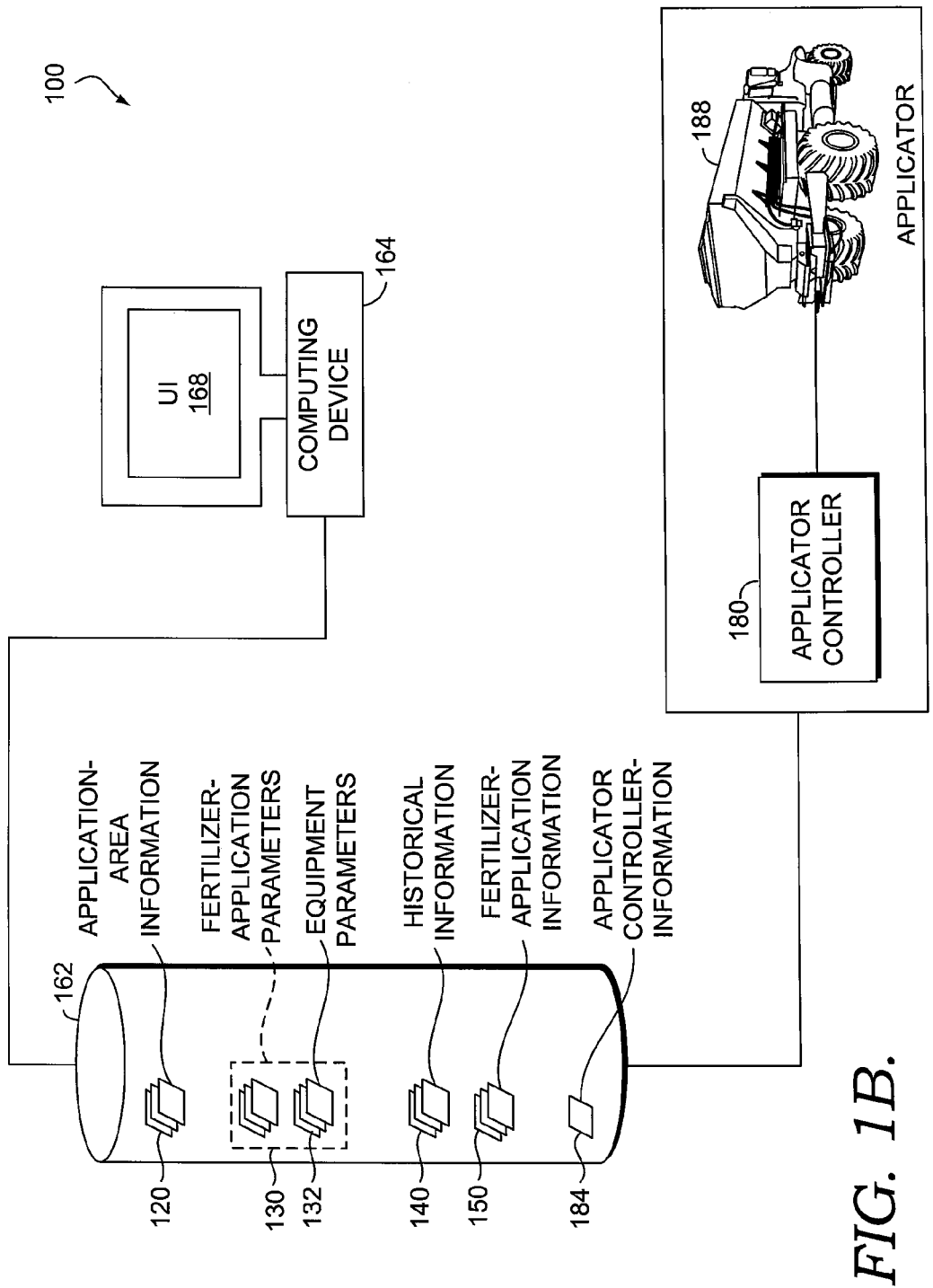

Turning now to FIGS. 1A and 1B, an exemplary operating environment 100 is shown suitable for practicing an embodiment of the invention. We show certain items in block-diagram form more for being able to reference something consistent with the nature of a patent than to imply that a certain component is or is not part of a certain device. Functionality matters more, which we describe. Similarly, although some items are depicted in the singular form, plural items are contemplated as well (e.g., what is shown as one data store might really be multiple data-stores distributed across multiple locations). But showing every variation of each item might obscure the invention. Thus for readability, we show and reference items in the singular (while fully contemplating, where applicable, the plural).

As shown in FIG. 1A, Environment 100 includes agrochemical or fertilizer application-area 110, ("application-area 110") which might include one or more fields, pastures, orchards, courts, golf courses, yards, lawns, planting or cultivating beds, lots, or similar areas of land, or a portion of such an area suitable for receiving an application of an agrochemical. Although the term "fertilizer application area is shown in FIG. 1A and other figures, it is contemplated that in some embodiments, the term "fertilizer application area" refers to an area of land suitable for receiving any agrochemical. Thus application-area 110 represents an area of land suitable for receiving an application of agrochemical, and is made up of a portion of land; for example, as shown in exemplary environment 100, application-area 110 is a small portion of land in the State of Missouri 115. Despite being referred to as "application-area," it is not a requirement that all portions of application-area 110 necessarily receive fertilizer. For example, it is contemplated that in some scenarios, portions of land within application-area 110, for example buffer areas, will not receive fertilizer.

Fertilizer application-area 110 includes characteristics 112, which comprise features, geography, terrain, composition, or nature of various locations in application-area 110. For example, characteristics 112 might include the elevation, slope, soil structure, wetness, soil pH-level, soil organic matter, texture, residue, permeability, apparent electrical conductivity (ECa), vegetation, presence and quantity of a substances in the soil, average daily exposure to sunlight, average rainfall, temperature, or any other characteristic that might be relevant to fertilizer application.

FIG. 1B illustrates another aspect of exemplary operating environment 100. FIG. 1B shows data store 162 that stores fertilizer-application related information. This information includes application-area information 120 and fertilizer-application parameters 130. This information may also include historical information 140 and fertilizer application information 150, in some embodiments. In some embodiments, data store 162 comprises networked storage or distributed storage including storage on servers located in the cloud. Thus, it is contemplated that for some embodiments, the information stored in data store 162 is not stored in the same physical location. For example, in one embodiment, one part of data store 162 includes one or more USB thumb drives or similar portable data storage media. Additionally, information stored in data store 162 can be searched, queried, analyzed using computing device 164 and user interface 168. For example in one embodiment, a grower could input a query, through user interface 168, of past fertilizer-application schedules for an entire application area or for a portion of an application area, search for only those portions of an application area that have previously received enhanced fertilizer, or specify information in data store 162 to be shown on a geographic map of an application area, such as showing a map of a current fertilizer-application schedule with information depicting a cost-benefit analysis for each application cell.

Application-area information 120 includes attribute information corresponding to characteristics 112, which in some embodiments includes attribute values that are geographically referenced within application-area 110 or associated with location information. Application-area information 120 may further include other geographic information of application area 110 such as its geographic location, proximity to streams, roads, wetlands, or similar features. In some embodiments, application-area information 120 comprises one or more sets of measured or determinable values of a characteristic at locations in an application area. For example, for the attribute of soil pH, application-area information 120 might include a set of attribute values representing the location and measured soil pH-levels of various location points in the application area. Similarly, for the attribute of elevation, application-area information 120 might include a Digital Elevation Model (DEM) of the application area. In one embodiment, application area information 120 includes information representing characteristics 112, characterized as values per portions of a grid that logically overlays the application area. Each attribute value can also be associated with the indices of the grid, where an index represents a location point in the application area and each point has a corresponding value representing a degree of expression of a particular characteristic, in one embodiment.

Application-area information 120 might include data provided by a user, a geographic information system database (e.g., GIS) or similar database, or field records, in one embodiment, and may also include additional information determined from this data. For example, application-area information corresponding to slope can be determined from other application area information such as elevation. Similarly, a Topographic Wetness Index can be determined from other application-area information such as a DEM and other spatial input variables representing characteristics 112 of application area 110.

Fertilizer-application parameters 130 comprise information used for determining a fertilizer application based on application-area information 120. This includes information such as (1) indications of fertilizer-applicator equipment (e.g., the type applicator, which fertilizer sources and how many fertilizer sources it can apply, its application reach, which affects the application cell size); (2) user application preferences such as a risk-avoidance level for known risk areas, fertilizer-application rates or quantities, preferred fertilizer types, user-specified buffer areas, and application-cell size, for example; (3) available fertilizer types; (4) rates and ratios of fertilizer types to apply for given application-area characteristics; (5) attribute thresholds or index thresholds; (6) information about the type of crop that will be grown in the application cell; (7) historical data such as previous parameters, previous application rates and ratios, and past crop yields; (8) economic parameters such as the cost of the fertilizer or cost-benefit analyses of the cost for applying a particular fertilizer to an application cell verses the expected gain from an improved crop-yield from that cell; (9) government regulations (which, for example, might limit the quantity, application rate, or location of certain types of fertilizer sources that can be applied); and (10) local geographic information (such as a nearby stream or wetlands that might affect which fertilizer is to be applied to adjacent application cells.

Equipment parameters 132 is a subset of fertilizer-application parameters 130 and includes parameters relating to the fertilizer-applicator equipment and other parameters affecting the physical limitations of applying fertilizer. For example, equipment parameters 132 may include the reach or coverage-area of an applicator for given types of fertilizer or information which can be used to determine an applicator's reach or coverage-width, such as a model number of a fertilizer applicator. In one embodiment, equipment parameters 132 is used to determine application-cell width during the logical partitioning of application cells.

Historical information 140 includes historical data relating to the application area such as previous fertilizer-applications or determined fertilizer-application products, crops and crop yields, and soil characteristics. In some embodiments, information from historic information 140 may be included in application parameters 130. For example in one embodiment, some of fertilizer-application parameters 130 are based on data from historical information 140 such as previous application rates, user settings, or past crop yields resulting from a previously implemented fertilizer-application strategy. Historical information 140 can also include additional information such as previous analyses of fertilizer application strategies, meteorological records for an application area, or changes in crop yields over time, usable for analyzing fertilizer-application scenarios and facilitating determining a current fertilizer-application strategy. By way of example, a grower could view a geographically referenced map of a current fertilizer application strategy for a field and also view information from historical information 140, such as locations and success rates of previous crop yields, overlaid onto the map.

Fertilizer-application information 150 is received from computing device 164 and stored in data store 162. Fertilizer-application information 150 includes the results of the process for determining a fertilizer to apply to an application cell based on application-area information 120 and fertilizer-application parameters 130. This includes information specifying a product of fertilizer to apply in an application cell. Fertilizer product includes the type or types of fertilizer, and can also include quantity of fertilizer, application rate, and fertilizer-mixture information such as a proportion of mixed fertilizer types. In one embodiment, fertilizer-application information 150 may also specify location information for the application cell. Location information defines the application cell's location either relative to other application cells or the boundary or corner of an application area, as latitude and longitude, or as another geographically referenced location. In one embodiment, fertilizer-application information 150 includes a fertilizer-application schedule, which specifies a fertilizer product for each application cell.

Fertilizer-application information 150 is used for generating applicator-controller information 184, which is discussed below. In some embodiments, fertilizer-application information 150 also can be used to produce charts, tables, or geographically referenced maps showing fertilizer application products for an application area, thereby enabling a grower to see or modify a fertilizer application strategy for the application area. Fertilizer-application information 150 also includes results of additional analysis performed using fertilizer-application information 150, in one embodiment. For example in one embodiment, fertilizer-application information 150 includes a geographically referenced mapping of fertilizer-application products for each application cell in an application area, and associated economic information such as the cost of the fertilizer-application product for each application cell or a cost-benefit analysis comparing fertilizer cost verses an expected crop yield or expected profit for each application cell. In time, fertilizer-application information 150 becomes part of historical information 140.

Environment 100 also illustratively shows computing device 164 that is communicatively coupled to data store 162, user interface 168, and applicator data store 182. Computing device 164 processes application-area information 120 and fertilizer-application parameters 130 to produce fertilizer-application information 150. Computing device 164 also processes other information in data store 162 for subsequent analysis, in some embodiments. Computing device 164 includes one or more processors operable to receive instructions and process them accordingly, and may be embodied as a single computing device or multiple computing devices communicatively coupled to each other. Therefore it is not a requirement that user interface 168 be physically attached to computing device 164, as shown in FIG. 1B. In one embodiment processing actions performed by computing device 164 are distributed among multiple locations such as a local client and one or more remote servers. By way of example, processing used for determining application-area information 120 based on characteristics 112 might be performed by a local client computer, while processing to create instructions for applicator-controller 180 based on fertilizer-application information 150 and processing involved in fertilizer-application analysis such as cost-benefit analyses and regulatory-compliance, may be performed on a remote server. In another embodiment, computing device 164 is a computer, such as a desktop computer, laptop, or tablet computer with user interface 168 including a display and a keyboard, mouse, touchpad, or similar user input means. Example embodiments of computing device 164 include a desktop computer, a cloud-computer or distributed computing architecture, a portable computing device such as a laptop, tablet, ultra-mobile P.C., mobile phone, a navigational device, or dashboard-computer mounted in a vehicle such as a tractor or fertilizer applicator.

User interface 168 is used for displaying information and parameters stored in data store 162 including fertilizer-application information 150, which in some embodiments, may be in the form of one or more tables, charts, or geographically referenced maps. User interface 168 can also receive information from a user such as fertilizer-application parameters 130, application-area information 120, or historical information 140. In one embodiment, user interface 168 is capable of receiving user input regarding which attributes of application-area information 120 and which fertilizer-application parameters 130 should be considered or ignored for determining fertilizer-application information 150. User interface 168 can also receive user queries for the information in data store 162 or user requests for analysis performed on information in data store 162. For example, user interface 168 could display a geographically referenced map of fertilizer application information 150 for application area 110 and enable a user to input a request to see historic crop-yield information superimposed onto the map. In one embodiment, user interface 168 comprises multiple user interfaces, which may be distributed in different locations and may receive information from or provide information to more than a single user.

FIG. 1 also depicts an example fertilizer applicator 188. Fertilizer applicator 188 applies fertilizer to an application area and, in one embodiment, can take the form of a multi-bin fertilizer spreader which is attached to a vehicle or pulled by a vehicle, such as a tractor. Applicator 188 can take the form of other embodiments such as liquid-tanks, injection system, or an any applicator capable of applying a fertilizer product, which may be a solid, liquid, gas or combination of solid, liquid, or gas. The application of fertilizer by fertilizer applicator 188 is controlled by applicator controller 180. Applicator controller 180 controls the type and quantity of fertilizer released over portions of an application area. Fertilizer applicator 188 includes or is communicatively coupled to applicator controller 180. Applicator controller 180 controls fertilizer application using applicator controller-information 184. Applicator controller 180 is communicatively coupled to data store 162, and includes a processor, such as a microcontroller, for processing applicator controller information 184 to control applicator 188. In one embodiment the communicative coupling between applicator controller 180 and data store 162 comprises inserting a thumb drive including applicator controller information 184 a thumb-drive reader communicatively coupled to applicator controller 180. In one embodiment, applicator controller 180 also communicates feedback data about a fertilizer-application session, such as date, environmental conditions, or any modifications occurring to the application schedule, to data store 162.

Applicator-controller information 184 includes instructions usable by applicator controller 180 to direct the application of fertilizer by applicator 188, over portions of the application area 110. Applicator-controller information 184 is generated or determined by computing device 164 based on fertilizer-application information 150 and fertilizer-application parameters 130.

Figure 1C:
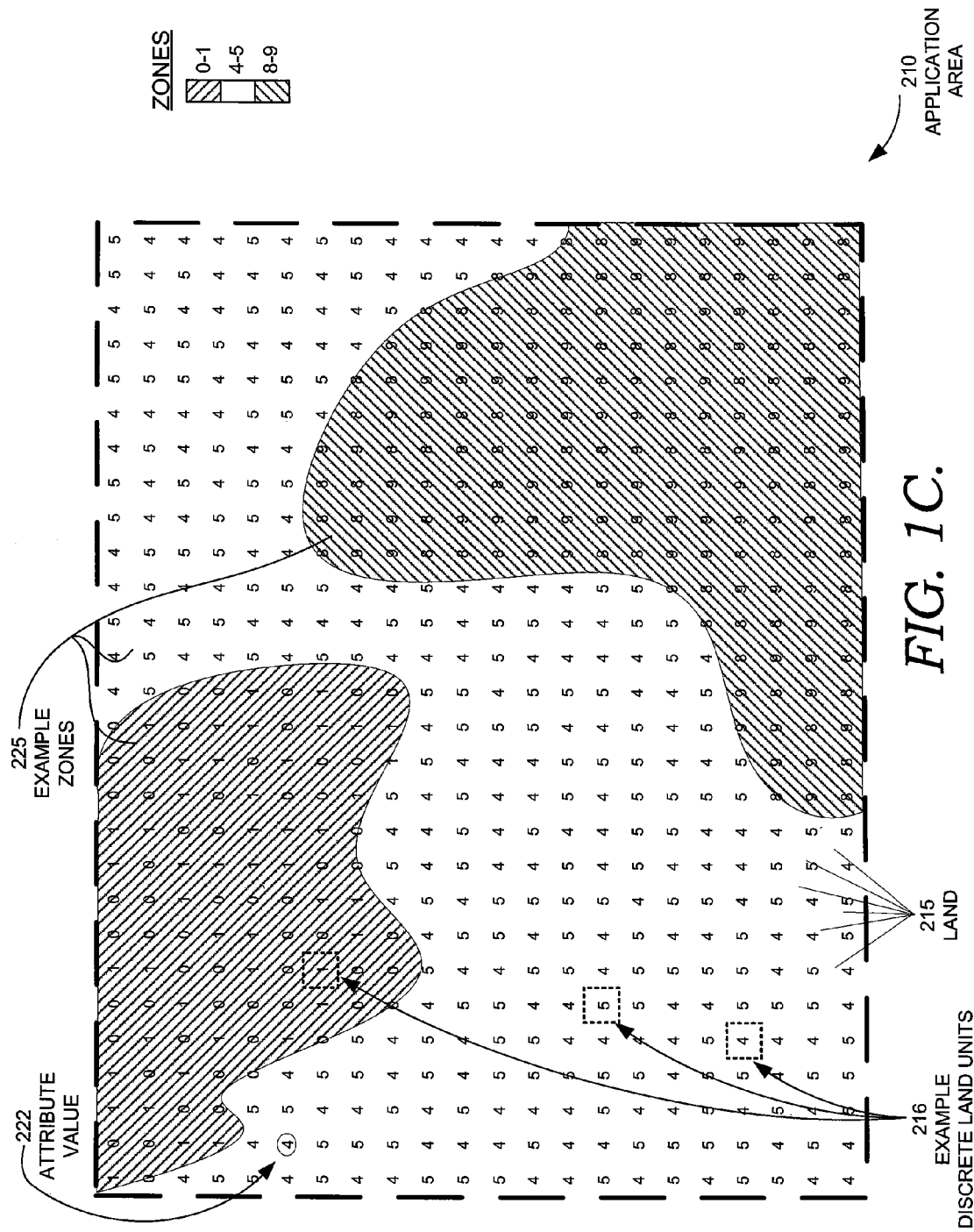
FIG. 1C depicts an area of land suitable for receiving fertilizer application in accordance with embodiments of the present invention.

FIG. 1C illustrates an example fertilizer application area 210, which could be made up of one or more fields, pastures, orchards, courts, golf courses, yards, lawns, planting or cultivating beds, lots, or similar areas of land 215, or a portion of such an area of land, suitable for growing an agricultural product, plant, or grass, or an area of land that is suitable for receiving any agrochemical. In one embodiment, application area 210 includes a plurality of discrete land units 216. Each discrete land unit 216 represents a discrete portion of land 215 located within application area 210.

Each discrete land unit 216 is associated with attribute value 222 corresponding to a degree of expression of an attribute possessed by the discrete land unit. An attribute value 222 may be expressed as numerical quantity (e.g., "6"), or as a classification (e.g. "acidic"). An attribute value 222 may be derived from a measurement of an attribute at a single point within a discrete land unit 216 or may be an average, median, or similar representative value of the degree of expression of an attribute possessed by discrete land unit 216. By way of example, for an attribute corresponding to elevation, a discrete land unit 216 might have an associated attribute value 222 of 735-feet above sea level. This attribute value 222 could represent a single point of elevation within the discrete land unit 216, or an average or median of elevation points within discrete land unit 216. A discrete land unit 216 may be associated with multiple attribute values 222, each corresponding to a different attribute. Moreover, the area of land 215 occupied by a discrete land unit 216 might depend on the associated attribute. For example, an attribute value for elevation taken from a DEM may specify a resolution such as 10 m, corresponding to discrete land units having a 10 square-meter area of land 215. Thus, the area of land 215 occupied by a discrete land unit 216 could be a large area, a small area, or even a single point, so long as an associated attribute value represented the attribute for that area.

FIG. 1C also shows example zones 225. A zone represents an area of land 215 in application area 210 that has similar attribute values 222. In one embodiment, zones 225 are made up of substantially contiguous discrete land units 216 having substantially similar attribute values 222. In another embodiment, a zone 225 is made up of substantially contiguous discrete land units 216 having attribute values 222 corresponding to the same attribute classification, such as "acid" or "alkaline." By way of example, consider two adjacently located discrete land units 216 having an associated attribute value 222 for soil pH-levels of 6.9 and 7.1 respectively. In one embodiment, the two discrete land units might be included within the same zone 225, because the two land units are adjacent to each other and their associated attribute values of 6.9 and 7.1 are substantially similar—i.e. both are very close to a neutral pH level. But in an embodiment where zones are made up of discrete land units having associated attribute values 222 corresponding to the same attribute class, the two discrete land units in this example might not be in the same zone because soil pH-levels of 6.9 and 7.1 correspond to different classes (e.g., 6.9 is acidic and 7.1 is alkaline). The example application area 210 of FIG. 1C shows three zones 225: a first zone made up of discrete land units having associated attribute values equal to 0 or 1; a second zone made up of discrete land units having associated attribute values equal to 4 or 5; and a third zone made up of discrete land units having associated attribute values equal to 8 or 9.

Figure 2A:
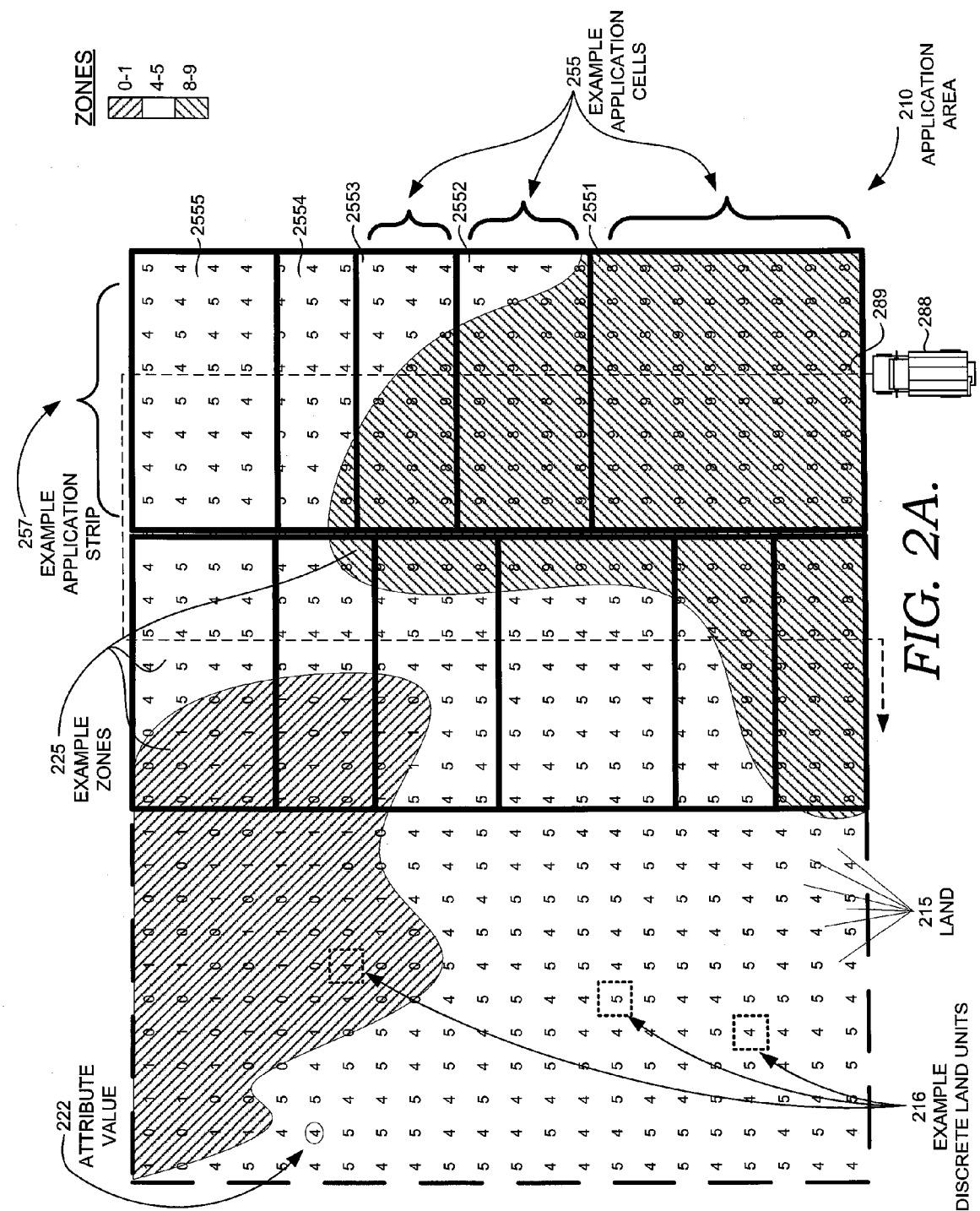
FIG. 2A depicts areas of land suitable for receiving fertilizer application, an example mapping of fertilizer-application cells, and fertilizer application by a fertilizer applicator in accordance with embodiments of the present invention.

Turning to FIG. 2A, application area 210 is shown logically partitioned into one or more application cells 255. An application cell 255 represents a portion of application area 210 that will receive a certain product of agrochemical. Each application cell 255 encompasses at least part of a zone 225.

Figure 4:
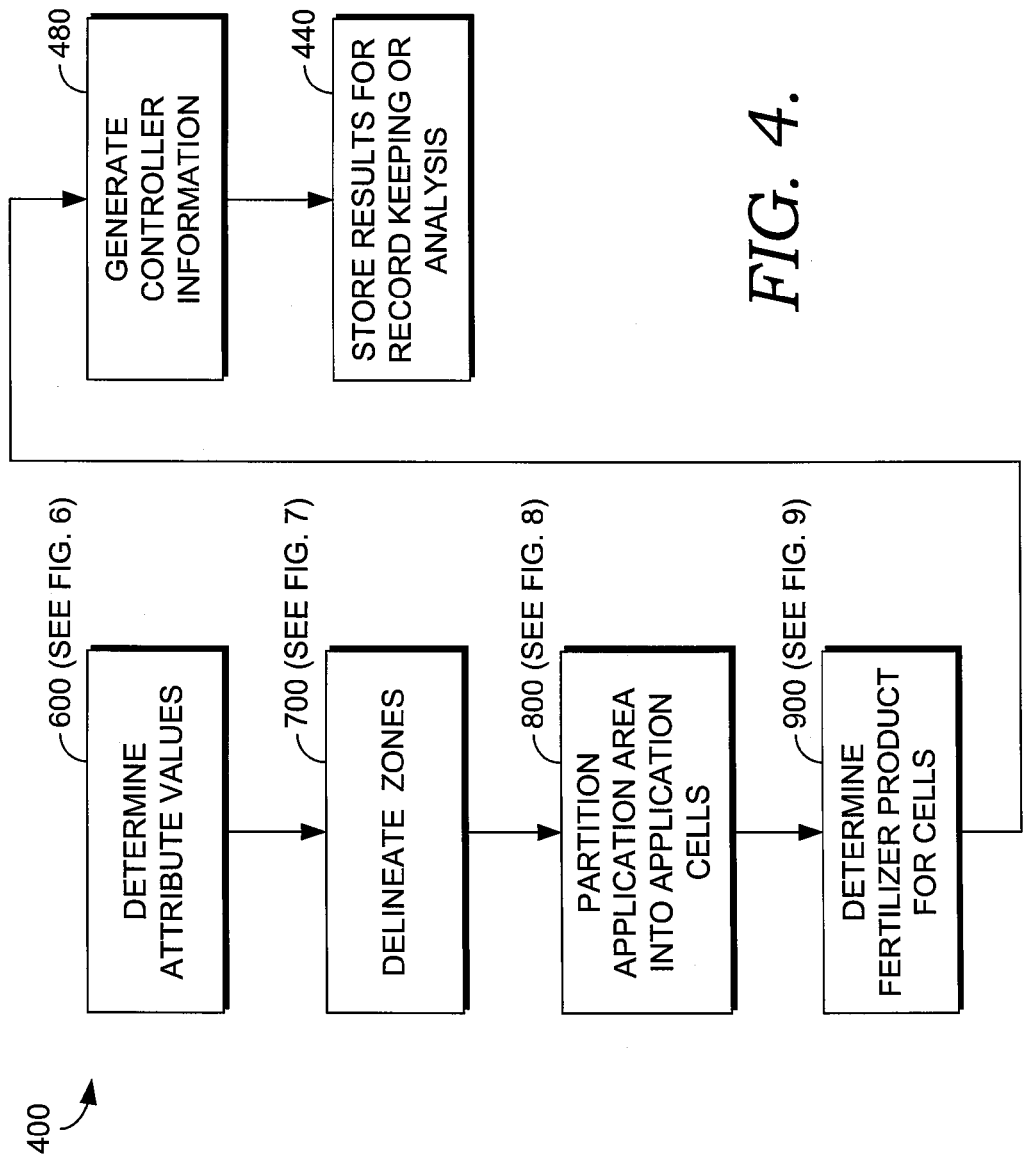
FIG. 4 depicts a method by which the present invention may be used in order to apply fertilizer to an application area.

Application cell 255 dimensions can vary based on fertilizer-application parameters 130, including equipment parameters 132 and user preferences, the size of application area 210, and the locations of zones 255. For example, in one embodiment, the width of application cells 255 is based on equipment parameters specifying the physical reach or coverage area of the fertilizer applicator to be used to apply fertilizer. In this embodiment, the dimensions of application cells 255 may be uniform for all application cells in the application area 210, or only one dimension, such as the width of application cells 255, may be uniform for all application cells. In the embodiment shown in FIG. 2A, only the width of the application cells 255 is a fixed dimension, based on physical limitations of the fertilizer applicator; the length of each application cell 255 varies based on the locations of zones 225. For example, application cells 2551 through 2555, shown on the left side of application-area 210, each encompass land of a different proportion of zones 225. Application cell 2551 and 2555 each encompass only land of a single zone 225. Application cells 2552, 2553, and 2554 encompass different proportions of different zones 225. One reason for varying cell length based on zones, as will be further described in connection to FIG. 4, is that the product of fertilizer determined to be applied for an application cell is based in part on the zones falling within the application cell.

In some embodiments, a row of partitioned application cells 255 of uniform width comprises an application strip 257. An application strip 257 represents an area of land covered by a single pass of a fertilizer applicator, such as fertilizer applicator 288. By way of example, applying fertilizer to an application area may be accomplished by a series of back-and-forth passes over the application area, to ensure the entire application area receives fertilizer. This is similar to mowing grass in a yard, where a lawnmower mows a series of adjacent paths back and forth over the yard. The width of grass cut by the mower, for each back-and-forth pass, is fixed and depends on the radius of the lawn-mower blade. Similarly, in the embodiment shown in FIG. 2A, the width of application strip 257, and therefore the application cells 255 within application strip 257, is a uniform width, which is determined based on the physical limitations of fertilizer applicator 288. Accordingly, fertilizer applicator 288 can therefore apply fertilizer to application area 210 by following a back-and-forth path 289 over application area 210, with each pass defining an application strip 257 of one or more application cells 255. In other embodiments, application cells 255 can exist independently of an application strip, depending on the applicator technology to be used for applying fertilizer.

Figure 2B:
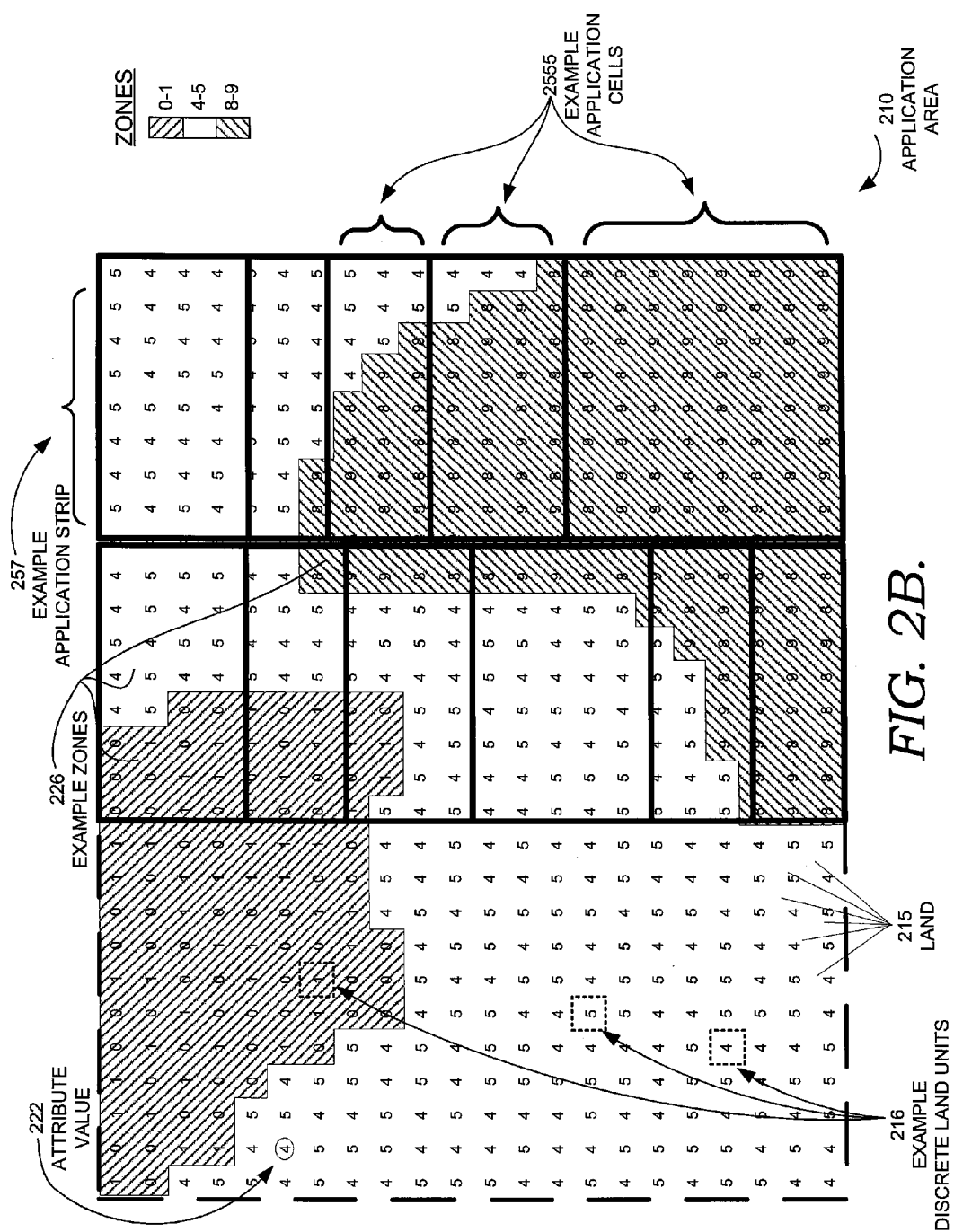
FIGS. 2B-2E depict areas of land suitable for receiving fertilizer application and an example mapping of fertilizer-application cells in accordance with embodiments of the present invention.

FIG. 2B depicts another embodiment of attribute zones for the same application area shown in FIG. 2A. FIG. 2B shows the same application area 210, made up of the same plurality of discrete land units 216, each having the same associated attribute values 222. But the boundaries of zones 226 shown in FIG. 2B are defined by the outer perimeters of the discrete land units 216 within each zone. In this embodiment, zones 226 are delineated by merging together substantially contiguous discrete land units 216 that have similar associated attribute values 222. FIG. 2B is provided to convey that regardless of how the boundaries of the attribute zones are determined, attribute zones include areas of land 215 having substantially similar attribute values 222 or attribute values 222 belonging to the same attribute classification.

Figure 2C:
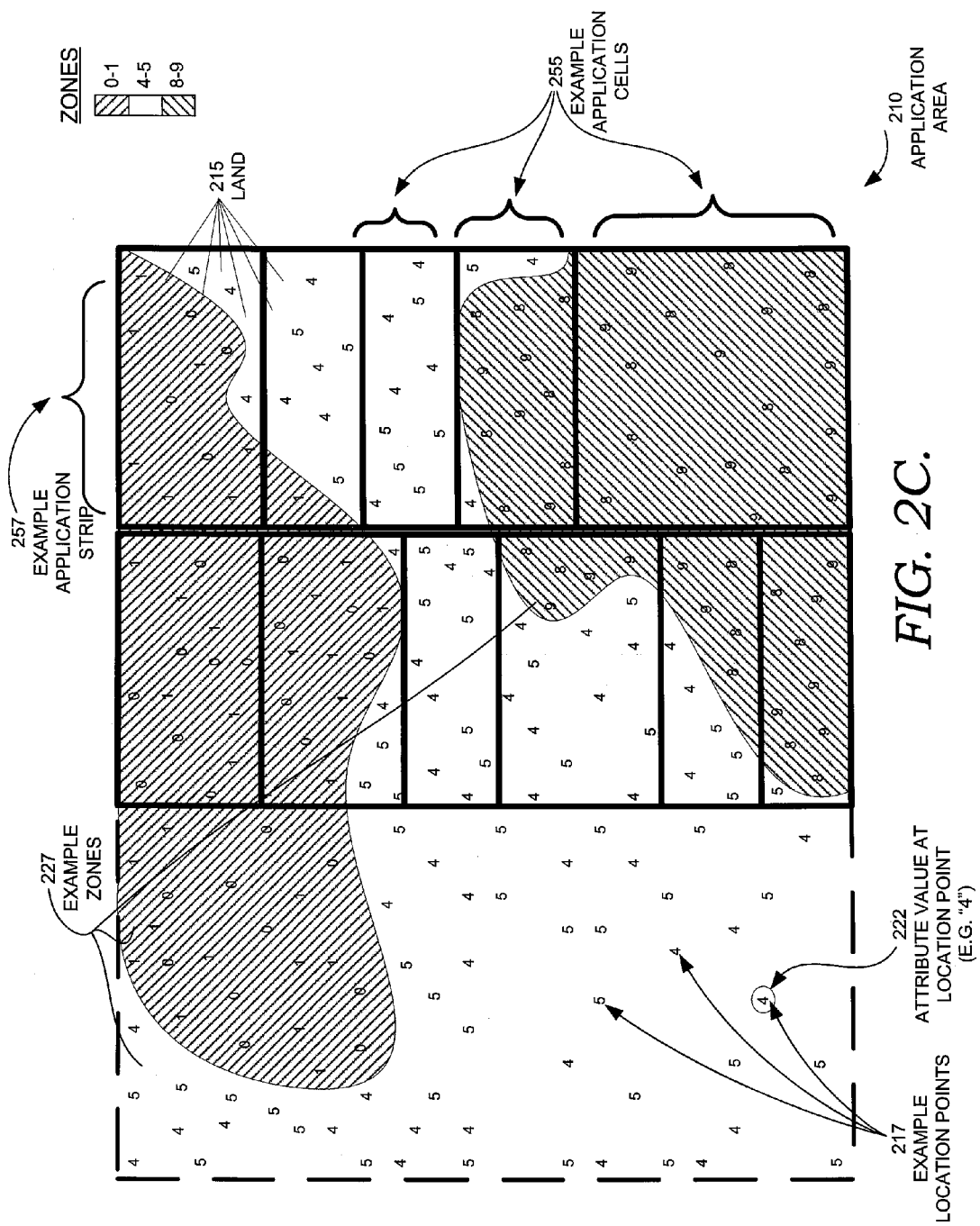

FIG. 2C depicts an application area 210, which includes example location points 217. Location points 217 are similar to discrete land units 216, in that each location point 217 has an associated attribute value 222 corresponding to a degree of expression of an attribute at that location point. Location points 217 may represent locations in an application area corresponding to measurements of an attribute, such as soil pH-level measurements, vegetation, soil structure, residue cover, depth to impermeable layer, or other attributes. These locations may be uniformly spatially distributed or located wherever attribute data, such as field measurements of attributes, are available. In some embodiments, location points 217 may be more densely located around areas where an attribute has a greater variance and may be more spread apart in areas where the attribute varies less. As shown in FIG. 2C, example zones 227 comprise an area of land 215 in application area 210 that has similar attribute values. In this embodiment, a zone 227 encompasses substantially adjacently located location points 217 associated with substantially similar attribute values 222. In another embodiment, zones 227 might include substantially adjacently located location points 217 associated with attribute values 222 of the same attribute class, such as "acid" or "alkaline."

Figure 2D:
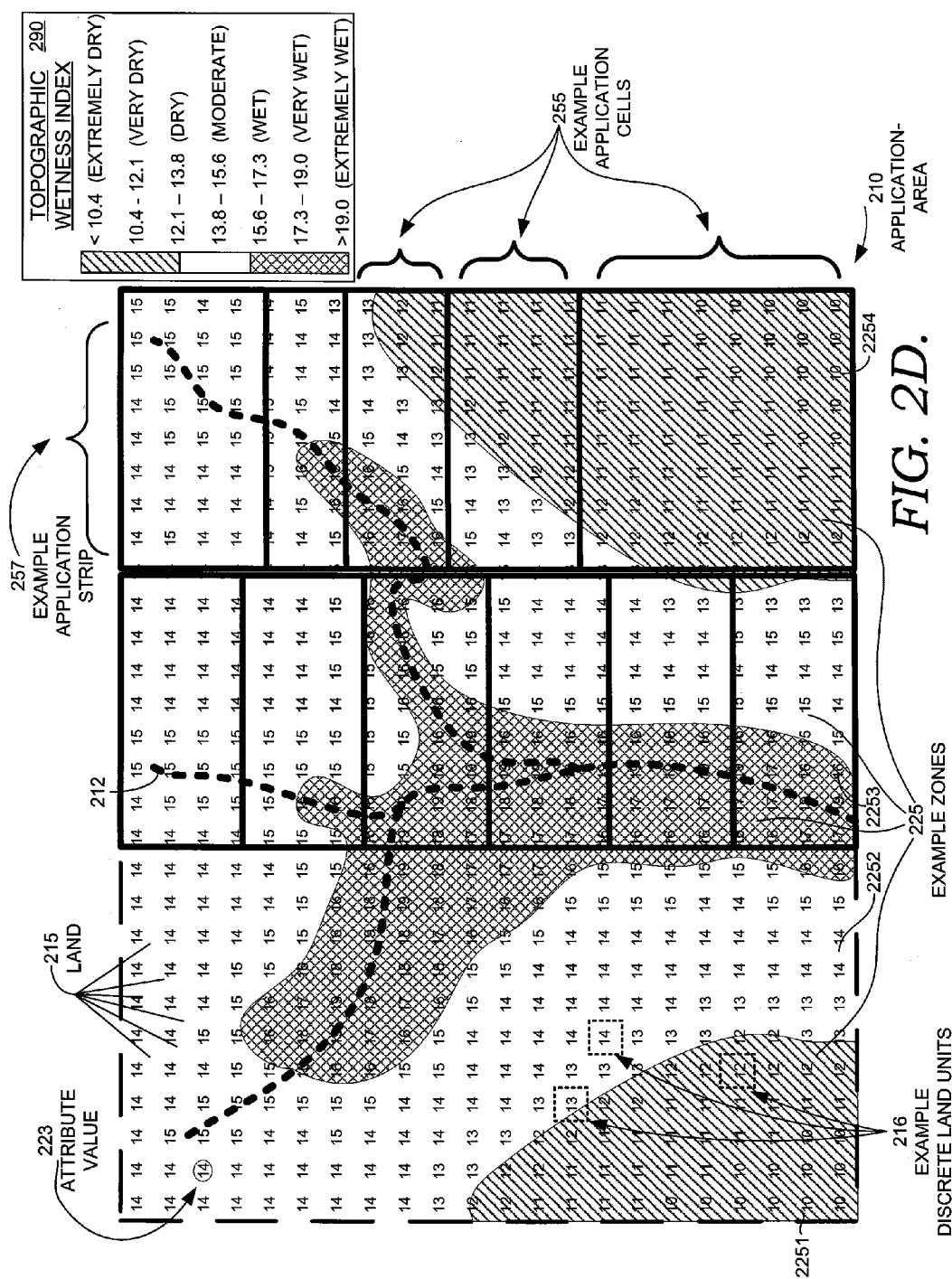

FIG. 2D shows one embodiment having an application area 210 made up of a plurality of discrete land units 216. The application area 210 of FIG. 2D also includes a drainage basin 212. In this embodiment, each discrete land unit 216 has an associated attribute value 223, which may be an index value that corresponds to an index that represents degrees of expression of an attribute. FIG. 2D depicts an example Topographic Wetness Index (TWI). Index legend 290 shows TWI values grouped by index classifications ranging from index values less than 10.4, correspond to an "extremely dry" class, to index values greater than 19.0 corresponding to an "extremely wet" class. Application area 210 also includes four zones 225; each zone includes discrete land units with associated index-values of the same index classification. Specifically, zone 2251 and zone 2254 are made of discrete land units 216 with associated attribute values 223 corresponding to dry classes of the TWI (i.e., index values less than 13.8); zone 2252 includes discrete land units 216 having associated attribute values 223 corresponding to the moderate class; and zone 2253 is made up of discrete land units 216 with associated attribute values 223 corresponding to the wet classes of the TWI. Zone 2253 may be expected to include land having wetter TWI values because zone 2253 surrounds drainage basin 212. In the embodiment shown in FIG. 2D, zones 2251, 2252, 2253, and 2254 are delineated based on having attribute-values belonging to the same attribute or index classification, rather than attribute values that are substantially similar to each other. Similarly, in an embodiment using attribute values that are not index values, zones may be delineated to include attribute values belonging to the same classification, rather than attribute values that are substantially similar to each other.

In some embodiments, a set of attribute values corresponding to a plurality of discrete land units 216 (or location points) located in an application area 210 is characterized or represented as an attribute grid, with each point on the grid corresponding to a location of a discrete land unit or location point having an associated attribute value. Likewise, in some embodiments a set of index values corresponding to a plurality of discrete land units 216 (or location points) located in an application area 210 can be characterized and represented as an index grid, with each point on the grid corresponding to a location of a discrete land unit or location point having an associated index value.

Figure 2E:
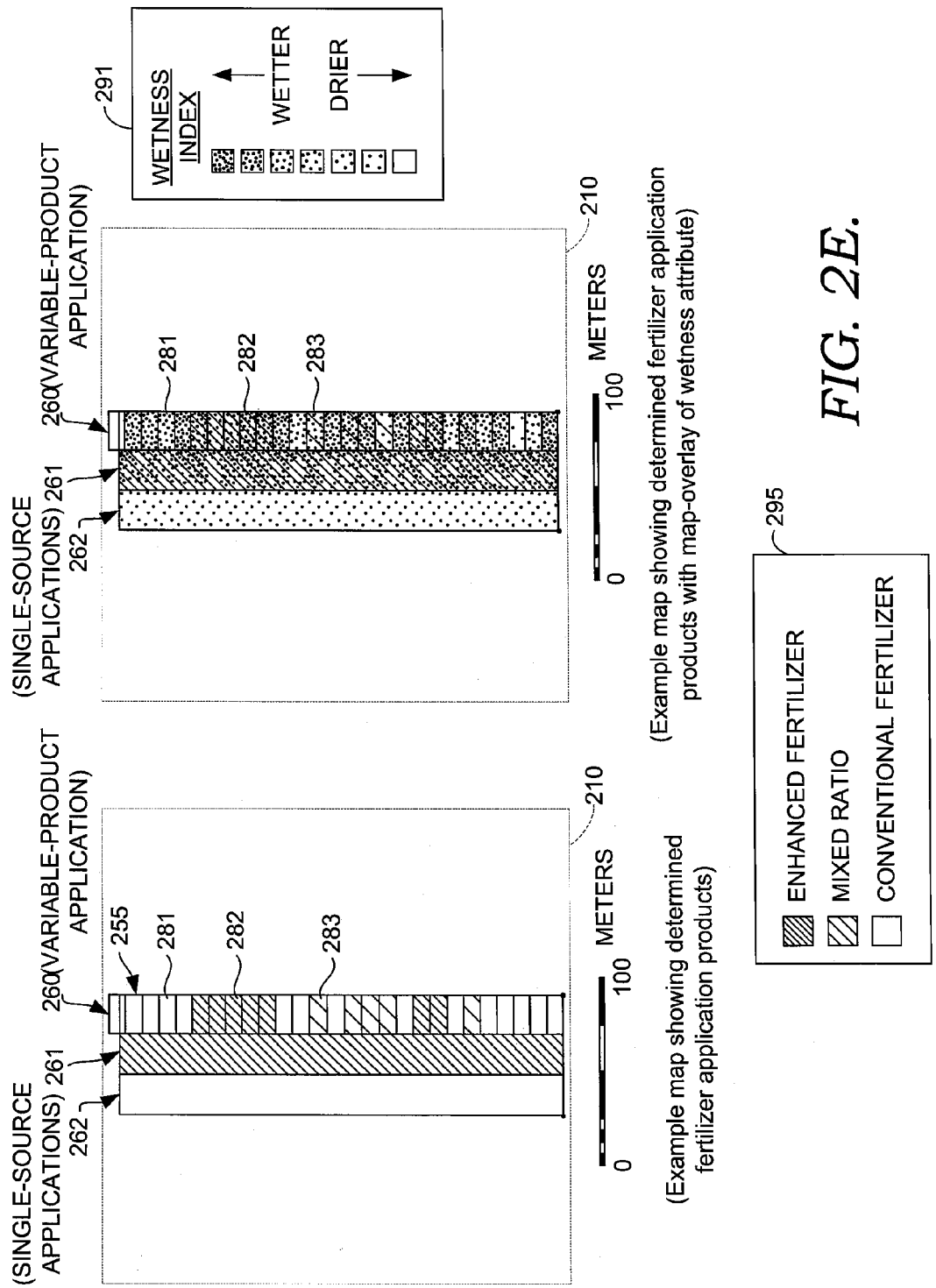

FIG. 2E illustrates two similar views of an application area 210. Both views show the same three example application strips superimposed over application area 210: application strip 260, which is made up of application cells 255, and application strips 261 and 262. For clarity, only three example application strips are shown in application area 210; although typically application cells or strips will cover the entire application area 210, it is not a requirement to do so. The right-hand view also depicts wetness-index values within the application strips. The wetness-index values are omitted on the left-hand view, for clarity. FIG. 2E also shows a fertilizer-application legend 295, which indicates a fertilizer product to be applied to application strips or cells shown in FIG. 2E, and an index-legend 291, which provides a visual representation of index values for the wetness attribute.

Application strip 260 represents a variable-product fertilizer application consistent with an embodiment of the invention. Application strip 260 is made up of a plurality of uniformly sized application cells 255. In the embodiment shown in FIG. 2E, each application cell has a uniform dimension. Each application cell 255 of application strip 260 has been evaluated to determine an appropriate product of fertilizer to be applied to the cell, based on wetness index values associated with the discrete land units or location points (not shown) enclosed by each application cell 255.

For example, according to fertilizer-application legend 295, application cell 281 is coded for receiving a conventional fertilizer type. A conventional fertilizer type might be applied to an application cell that encompassed land having drier TWI values because the fertilizer would be less susceptible to leaching, evaporation, or environmental loss mechanisms, than it would if it were applied to land having wetter TWI values. Indeed, the right-hand view of application cell 281 shows that the land encompassed by application cell 281 includes attribute values corresponding to the drier side of index-legend 291. Similarly, application cell 282, which encompasses land with attribute values corresponding to the wetter side of index legend 291, is coded for receiving an enhanced fertilizer type. As previously described, an enhanced fertilizer type may be less susceptible to environmental loss mechanisms and is thus appropriate for application to areas having wetter TWI values. Application cell 283, which encompasses land with both dry and wet TWI values, is coded for receiving a mixture of enhanced and conventional fertilizer types. As used herein the term coded, as in "application cell 281 is coded to receive a conventional fertilizer type" is intended to mean that a particular fertilizer type is associated with an application cell.

In contrast to application strip 260, application strips 261 and 262 are shown designated for receiving a non-variable or single fertilizer source. These strips may also receive a fixed application rate. In other words, each strip receives only one fertilizer type, at a given fixed-application rate. Strips 261 and 262 are representative of the prior art of fertilizer application technology. Despite encompassing land with varying attribute values, strip 261 receives only an enhanced-type fertilizer and strip 262 receives only conventional-type fertilizer. As a result, areas having wetter TWI values within strip 262, may lead to greater loss of the conventional fertilizer by leaching or by other environmental loss mechanisms; similarly areas having drier TWI values within strip 261 may not require the more costly enhanced efficiency fertilizer.

Figure 3:
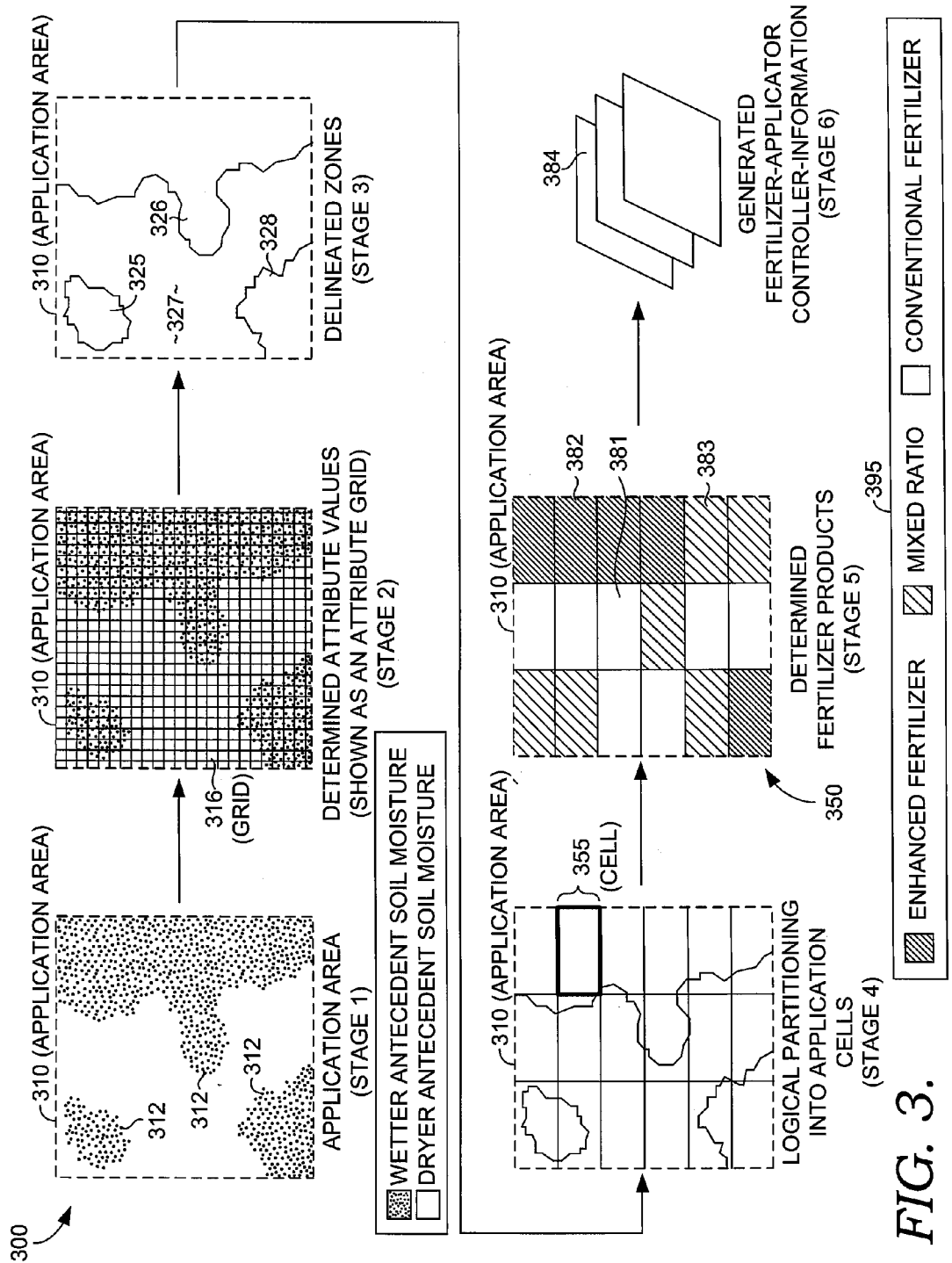
FIG. 3 depicts an illustrative process flow-diagram that illustrates an embodiment of facilitating a method of ultimately applying variable-product fertilizer to an application area.

Turning now to FIG. 3, an exemplary embodiment is provided showing an overview of a process of facilitating fertilizer application on an application area 310. For purposes of explanation, the process, which is referenced generally by the numeral 300, is shown broken down into 6 stages. Each stage of process 300 represents a different step or series of steps performed, and thereby provides a visual reference of what transpires, for one embodiment.

At a stage 1, fertilizer application area 310 is shown with land characteristics 312. In the example of FIG. 3, land characteristics 312 represent antecedent soil moisture, which may be characterized as attribute values representing TWI. Stage 1 only shows one example land characteristic 312 for clarity, but application area 310 can have multiple land characteristics, and it is contemplated that the example process of FIG. 3 can be performed on other attributes of application area 310. Furthermore in some embodiments, more than one characteristic or combinations of characteristics such as slope and depth to impermeability may be used to determine attribute values that are then used to delineate attribute zones.

As previously explained, in some embodiments, an application area such as application area 310 may be considered to be made up of a plurality of discrete land units, or may include a plurality of location points, with each discrete land unit or location point associated with a location, which can be a geographically referenced location or a relative location, and an attribute value, which represents a degree of expression of an attribute or characteristic at that location in an application area. At a stage 2, attribute values have been determined for a plurality of discrete land units within application area 310. In the embodiment shown, a set of determined attribute values are represented as an attribute grid 316, with each square in the grid corresponding to a location of a discrete land unit with an associated attribute value.

Once attribute values are determined, zones of land with similar attribute values are delineated. A stage 3 depicts delineated zones including an example zone 325 in application area 310. As will be explained, a zone is delineated based on attribute values associated with the discrete land units of application area 310. At a stage 4, application area 310 is logically partitioned into application cells, such as example application cell 355. In this embodiment, the partitioned application cells have a uniform dimension. In other embodiments, application cell location and dimensions may vary based on the locations of zones. As will be explained, application-cell dimensions may be determined based on fertilizer-application parameters and the attribute zones. The process of logically partitioning an application area into one or more application cells is sometimes referred to as "fish-netting" since each application cell can resemble a single mesh of a fishnet.

Once an application area is logically partitioned into application cells, a fertilizer product is determined for each application cell. A stage 5 of process 300 illustrates logically partitioned application cells, of application area 310, associated with a fertilizer product, as indicated by a shading of each application cell. As will be explained, a fertilizer product is determined based on attribute values of zones within each application cell and based on fertilizer application parameters, in one embodiment. The fertilizer product may specify a quantity and type or mixture of fertilizer types to be applied. Each application cell is coded for receiving the determined fertilizer product. For example, in the embodiment shown, according to legend 395, application cell 381 is to receive a conventional fertilizer type; application cell 382 is to receive an enhanced fertilizer type; and application cell 383 is to receive a mixed ratio of fertilizer types, for a given rate, respectively. The determination of which specific fertilizer types and quantities used for a mixture of fertilizer types is discussed in more detail with respect to FIG. 9.

Stage 5 of process 300 also provides an exemplary map 350 of application area 310 showing each application cell geographically referenced within application area 310, and each cell further indicating a fertilizer product to be applied within the cell. As will be explained, the output of the fertilizer-product determination step shown in stage 5, is a set of fertilizer application-information, which may be visually depicted as a map, table, schedule, or association of information. Fertilizer application-information includes information for a set of application cells within application area 310, an associated location for each application cell, and an associated product of fertilizer for each cell to receive. Additional information can be associated with each cell, in some embodiments. Thus, the fertilizer application-information can be used to generate a map such as map 350 shown in stage 5 of process 300. Such a map may be used to facilitate analysis of fertilizer application strategies and may be combined with other information useful for facilitating analysis or record keeping. For example, other embodiments of map 350 might also depict additional information including attribute zones, geographic features of the application area, attributes, crop information such as past crop yields geographically referenced within the application area, economic data such as the incremental cost of fertilizer for each cell or a listing of the total cost and quantities of fertilizer needed for the application, regulatory data, and other information.

A stage 6 of process 300 shows generated fertilizer-applicator controller information 384. In stage 6, the fertilizer-application information determined in stage 5 is used to generate applicator-controller information operable to direct a fertilizer applicator to apply fertilizer consistent with the determined product for each application cell.

FIG. 3 is intended to provide an overview of one embodiment; additional stages may exist in other embodiments. For example, the results of stage 5 may be used for reporting and record keeping, as we described next in connection to FIGS. 4 and 5, at steps 440 and 540, respectively.

Figure 5:
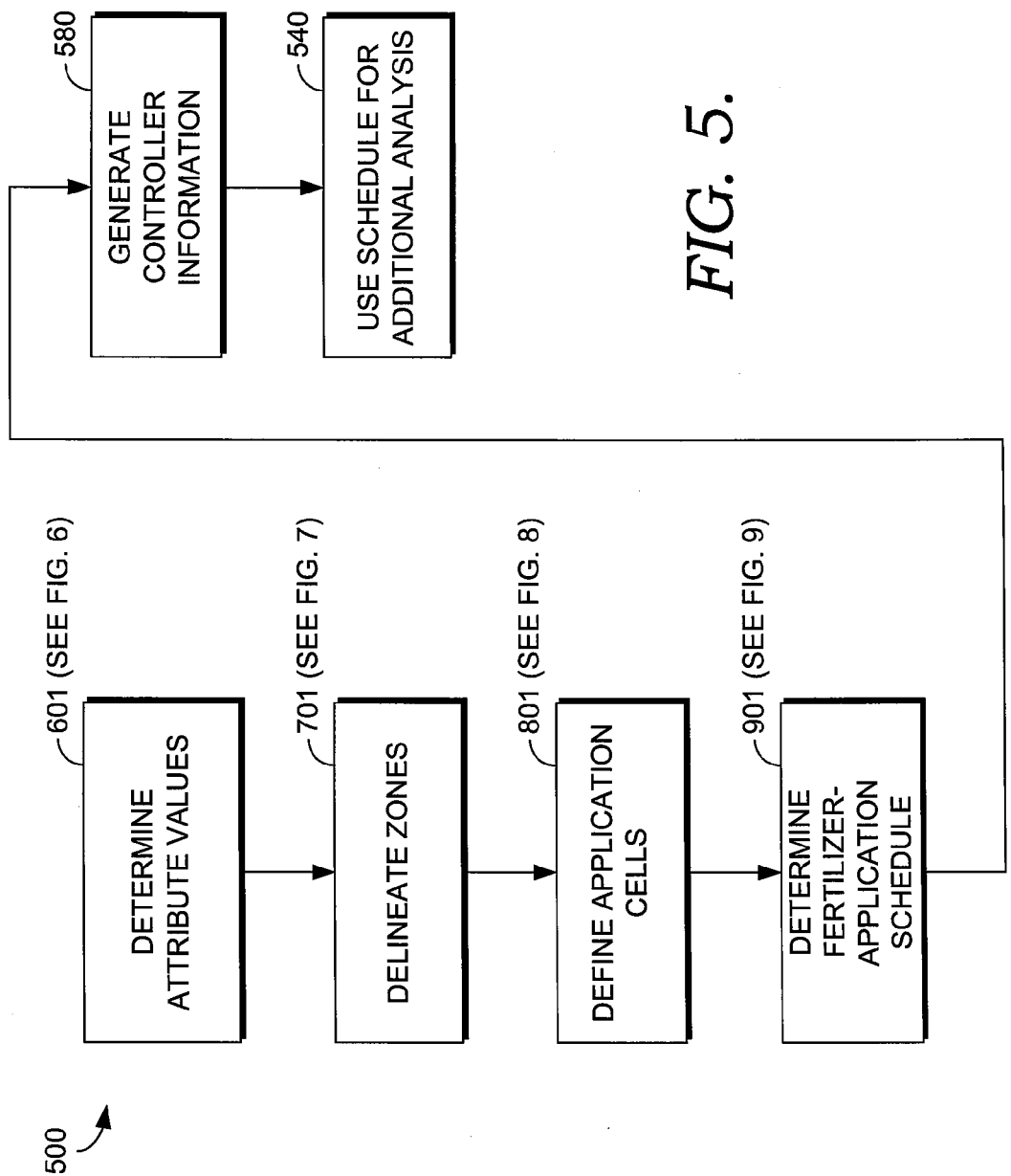
FIG. 5 depicts a method by which the present invention may be used in order to apply fertilizer to an application area.
Figure 6:
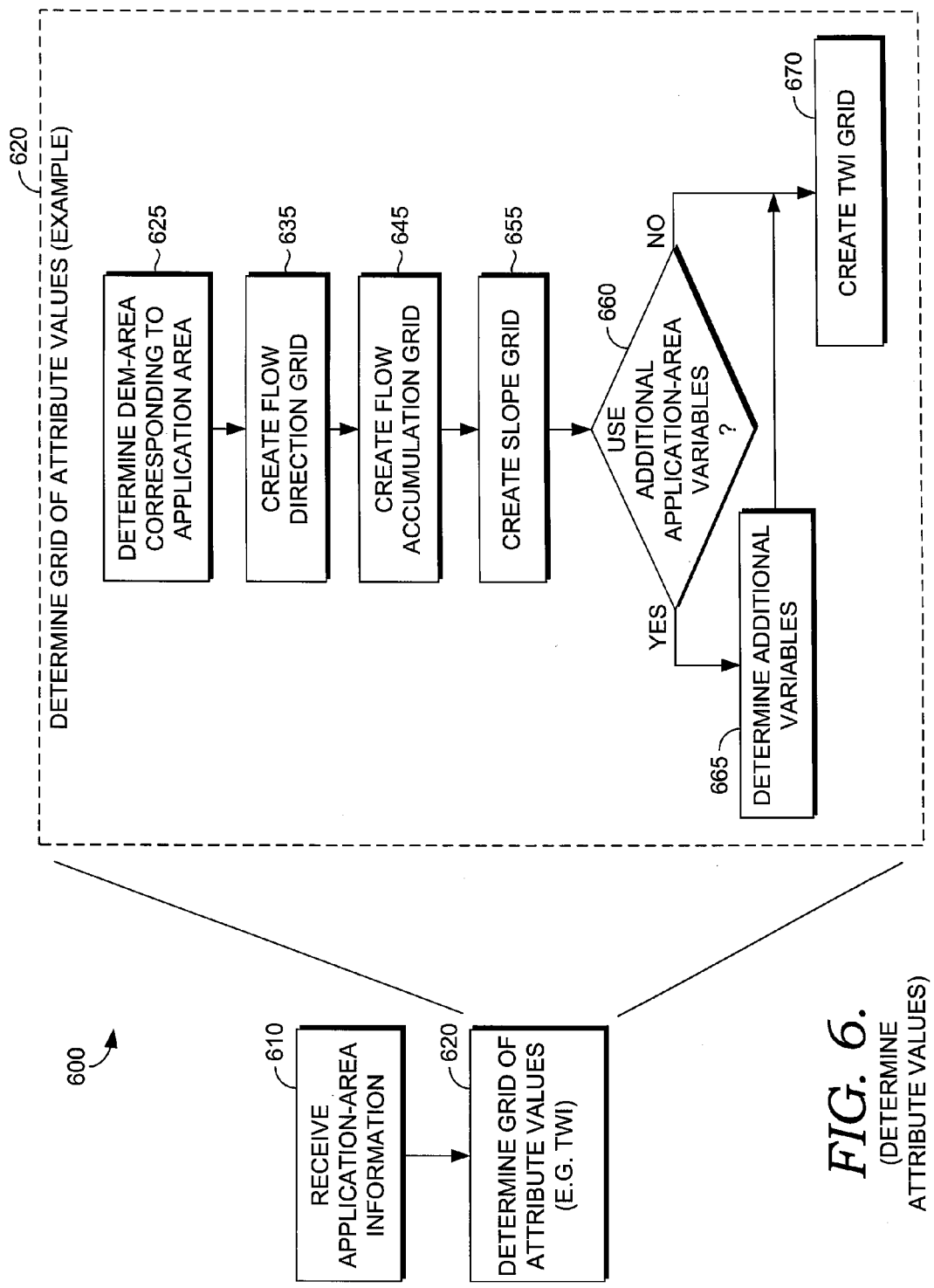
FIG. 6 depicts a method by which the present invention may be used in order to determine attribute values.
Figure 7:
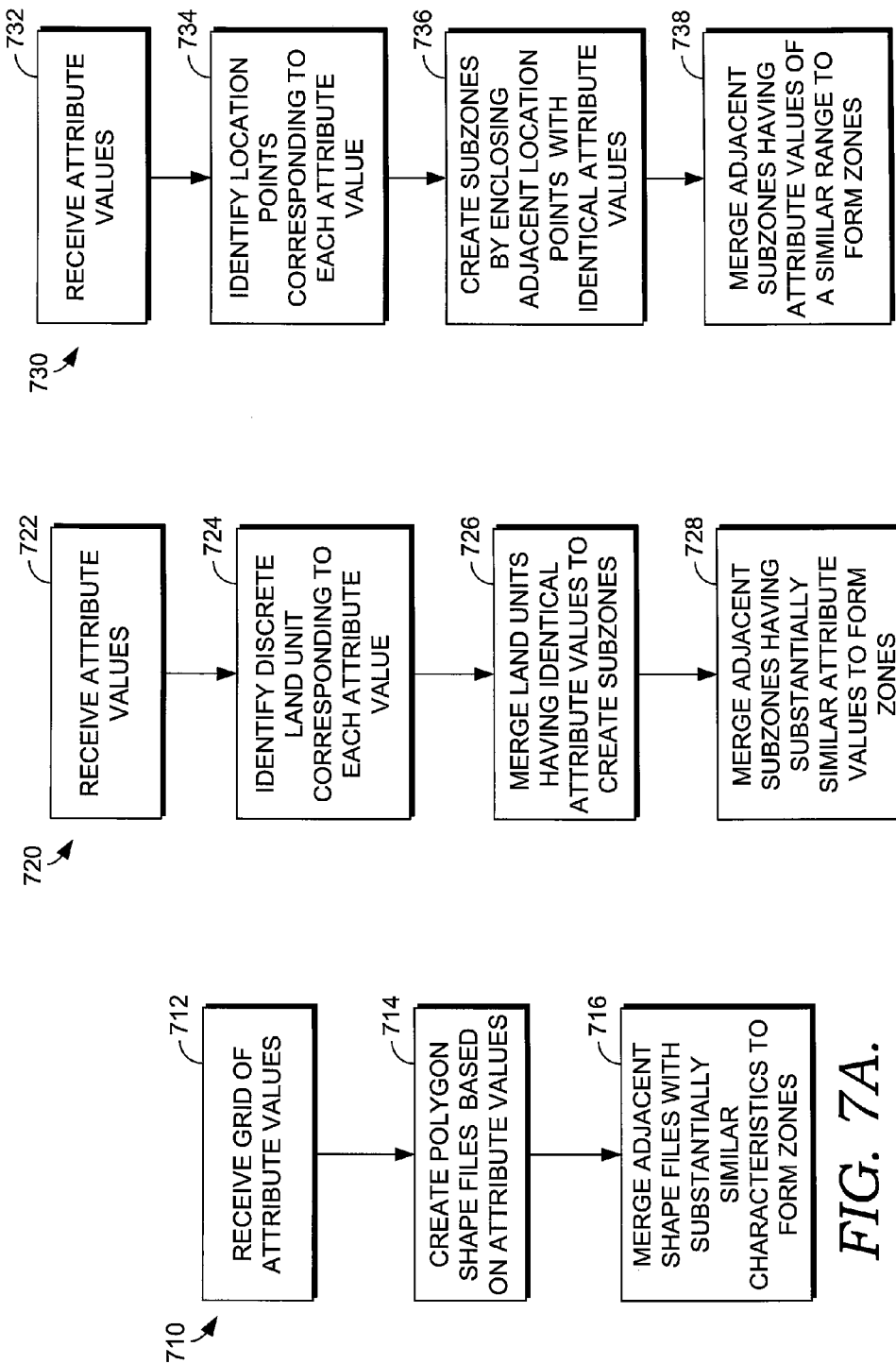
FIGS. 7A-7C depict methods by which the present invention may be used in order to delineate a zone.

FIG. 4 and FIG. 5 illustratively provide high-level flow diagrams of embodiments of a method of ultimately applying a variable-product fertilizer to an application area. FIGS. 6 through FIG. 9 illustratively provide lower-level flow diagrams of embodiments of the steps of the method embodiments depicted in the flow diagrams of FIG. 4 and FIG. 5. FIGS. 6. through 9 correspond to some of the steps depicted in FIG. 4 and FIG. 5. The methods depicted in the flow charts of FIGS. 4 through 9 are suitable for operation in example operating environment provided in FIG. 1. A computing device, such as computing device 164 of FIG. 1 is used to perform or facilitate performing each step.

Turning now to FIG. 4, a flow diagram is provided illustrating an exemplary method according to one embodiment, shown as 400. The method of flow diagram 400 is suitable for operation in the exemplary operating environment of FIG. 1. At step 600, attribute values are determined, based on application-area information. Further details of step 600 are provided in connection to FIG. 6. But as will be explained, an attribute value is determined for a plurality of location points or discrete land units in an application area, based on application-area information corresponding to the location point or discrete land unit. An attribute value thus represents a quantized degree of expression of an attribute, that when associated with a location point or discrete land unit, represents the expression of an attribute at that location. Application-area information includes information, which may be provided by a user or accessed from a data store, relating to one or more sets of measured or determinable values associated with the presence of a characteristic, at locations in an application area. For example, a DEM includes information representing elevation associated with geographicly referenced locations. Thus, a DEM corresponding to an application area will include values representing elevation at a plurality of locations in the application area. Therefore, in one embodiment, the DEM information functions as a set of attribute values. Accordingly, the attribute values for the elevation attribute may thus be determined by determining a portion of a DEM that corresponds to the application area.

An attribute value may express a numerical quantity, such as 735 feet above sea level, or a category or classification of an attribute, such as "acidic." An attribute value also may be determined from another attribute value. For example, attribute values for slope may be determined from attribute values for elevation. In some embodiments, the set of attribute values may be characterized as a grid, which logically overlays an application area, such that the points on the grid correspond to an attribute value at that location. In some embodiments, a plurality of attribute sets or grids may be used to determine fertilizer application. Therefore in these embodiments, multiple sets or grids of attribute values, corresponding to multiple attributes, may be determined at step 600.

The output of step 600 includes application-area information specifying a set of attribute values, each associated with a location point or discrete land unit in an application area. At a step 700, this information is used to delineate attribute zones of ground, within the application area, encompassing location points or discrete land units with similar associated attribute values. Each location within an application will fall within a zone. For example, if a zone for the soil pH-level attribute is delineated to include those discrete land units having associated attribute values (i.e., soil pH-levels, in this example) corresponding to "acid," then the remaining discrete land units of the application area will fall within a separate zone corresponding to "non-acid" or "alkaline and neutral" soil pH-levels. Further details of step 700 are provided in connection to FIGS. 7A through 7C.

At a step 800, the application area is partitioned into one or more application cells. As previously explained, an application cell represents a portion of land that will receive a certain product of fertilizer. Further details of partitioning step 800 are provided in connection to FIG. 8. As will be explained, the dimensions of the partitioned application cells are based on fertilizer-application parameters, the locations of attribute zones, or both. Fertilizer-application parameters include fertilizer-applicator equipment parameters that can determine the width of an application cell based on the reach of the fertilizer applicator used to apply fertilizer. The equipment parameters can also determine a minimum application cell length, based on limitations of the fertilizer applicator to change fertilizer products as it traverses the application area. In an exemplary embodiment, the width of each application cell will be uniform, but the length will vary based on the location of zones in the application area. In this embodiment, a row of application cells comprises an application strip, which represents one traverse of the application area by a fertilizer applicator. As will be explained in connection to FIG. 8, in one embodiment, application cell length may be determined based on the locations of zones, in order to minimize variance of zones in an application cell, as the cell length increases.

Because every location in an application area will fall within a zone determined in step 700, each application cell will encompass at least a part of a zone. As a consequence, associated with each application cell is zone information about each zone, zones, or zone portions enclosed by the application cell. This information includes the area of the application cell occupied by a zone or a portion of a zone and the zone attribute and attribute values associated with the zone.

At a step 900, a fertilizer product, for application within each application cell, is determined. The zone information associated with each application cell may be used with fertilizer-application parameters to determine a product of fertilizer to apply to each application cell. As previously explained, a fertilizer product can specify a quantity and type or mixture of fertilizer types to be applied, as well as a rate, in one embodiment. The zone information associated with each application cell, in partitioning step 800, includes attribute values associated with a zone that can be used to determine a fertilizer type appropriate for the zone. For example a zone having attribute values indicating wetness may be designated to receive an enhanced-type fertilizer. As will be explained, in one embodiment, the fertilizer product determined for an application cell is based on the area of the application cell occupied by a zone or a portion of a zone. For example, in this embodiment an application cell occupied entirely by a portion of a wet zone, might be determined to receive an enhanced-type fertilizer, depending on other fertilizer application parameters. But an application cell that encloses multiple zones or portions of zones might receive a mixture of fertilizer types, wherein the mixture ratio is proportional to the area occupied by each zone or zone portion within the application cell. In another embodiment, the attribute values of location points or discrete land units enclosed by an application cell are used to determine a fertilizer product. Each application cell is coded for receiving a determined fertilizer product corresponding to that cell.

The output of step 900 is fertilizer-application information. In one embodiment, this comprises a set of application cells, each associated with information indicating cell location in an application area and a product of fertilizer to be applied to the cell. In one embodiment, the application cells are associated with geographically referenced location information. Additional information relating to attribute-values and information from the fertilizer-application parameters may also be associated with each cell. Further details of step 900 are provided in connection to FIG. 9.

At a step 480, application controller information for a fertilizer applicator is generated. Specifically, the fertilizer-application information outputted from step 900 is used to generate computer instructions for operating a fertilizer-applicator controller to control fertilizer application by a fertilizer applicator consistent with the fertilizer product determined in step 900. Fertilizer-application parameters include information relating to a fertilizer applicator or a controller used by the applicator, for example, a model number, controller identification, or similar information usable for determining a controller and generating instructions executable by the controller for applying fertilizer. In one embodiment, this includes a table or library of instructions for controlling application by the fertilizer applicator.

In one embodiment, fertilizer-application information is used to create a shape file, which graphically indicates the locations of application cells in an application area and the determined fertilizer product for each cell. The determined fertilizer product may be indicated by color, shading, or a similar visual reference, as shown in stage 5 of FIG. 3 or the left-hand side of FIG. 2E, for example. Using a library of instructions for a controller, the shape file is then converted to an appropriate file format for execution by the controller.

The fertilizer application is location dependent; each cell is associated with a location in the application area. Accordingly, in one embodiment, controller instructions include a fertilizer product to apply for a given application cell and an associated location information, which may define the boundaries (or merely the cell length) of that application cell. In an embodiment having uniformly sized application cells, controller instructions may correspond to a listing of fertilizer products such that a controller applies a product specified on the list for a certain duration or distance. In one embodiment, location information may be present via the fertilizer applicator and the applicator controller may receive location information in real-time (or near real-time) to determine an immediate product of fertilizer to apply based on that received location.

Continuing with FIG. 4, at a step 440 the results of step 900, including the fertilizer-application information, may be stored for record keeping or used for subsequent analysis, in one embodiment. Stored information becomes part of a set of historical information, over time, which can be used in future fertilizer-application sessions or analysis, in some embodiments. Analysis may also be performed using the fertilizer-application information from step 900. By way of example, fertilizer application information may be used to generate a table or listing of fertilizer application products for each cell or geographic map of the application area showing each application cell associated with a determined product of fertilizer to be applied to that cell. Fertilizer products to be applied to each cell may be indicated by color-coding, shading, text, outlining, or similar means. In one embodiment, fertilizer application parameters, such as user-provided information, date or time information, regulatory information, fertilizer costs, near-by geographical features, or crop-related information is included on the map or automatically placed with the map into a report that details recommended variable-product fertilizer (or agrochemical) application. This information may, in one embodiment, be stored in a file, viewed, and printed. In another embodiment, a user may export a map showing fertilizer application as a shape file or similar format, which then can be used as a map layer with other information such as crop-yield maps. In another embodiment, a table or geographic map indicating fertilizer products for each application cell is generated with information indicating economic information such as the cost of fertilizer for each cell or the total fertilizer cost, an estimated differential crop yield resulting from applying one determined product vs. another determined product of fertilizer for an application cell, expected profit from crops or a cost-benefit analysis, which compares the cost of applying a determined product of fertilizer vs. the estimated crop yield or profit corresponding to an application of the determined product of fertilizer, for an application cell. In other embodiments, additional information may be included on a geographic map or table indicating fertilizer products for each application cell, such as: attributes of the application area, as shown in the right-hand side of FIG. 2E; historical information representing past fertilizer applications or past crop yields; an indication where user-preference deviates from determined fertilizer products for each application cell; an identification of total fertilizer quantities, brands, types, rates, or mixture ratios; applicator equipment information; or government regulations. Such additional information may be geographically referenced on the map where appropriate, in some embodiments. By way of example, consider an application cell that would otherwise be determined to require a certain product of fertilizer, but because of a fertilizer application parameter such as a government regulation or user-specified buffer, a different product of fertilizer has been determined. Information representing this can be represented on the map, and geographically referenced to the application cell or cells to which it applies. In one embodiment, an asterisk may be placed on a cell and below the map the asterisk may correspond to information affecting that cell's determined product of fertilizer, such as a message indicating that the fertilizer product determined for the cell is affected by a user-designated buffer. Other combinations of information, representing fertilizer-application information including the determined product of fertilizer, historical information, and application area information, may be visually presented on a user interface as a geographically referenced map of an application area suitable for use by a grower, fertilizer distributor, or user to facilitate determining or analyzing a fertilizer application strategy.

FIG. 5 is a flow diagram illustrating an exemplary method according to one embodiment, shown as 500. The method of flow diagram 500 is suitable for operation in the exemplary operating environment of FIG. 1. At step 601, attribute values are determined, based on application-area information. Further details of step 601 are provided in connection to FIG. 6. But as will be explained, an attribute value is determined for a plurality of location points or discrete land units in an application area, based on application-area information corresponding to the location point or discrete land unit. In one embodiment, the attribute values are index values. An index value represents a quantized degree of expression of a characteristic or attribute scaled or applied to an index that when associated with a location point or discrete land unit, represents the expression of a characteristic or attribute at that location according to an index of characteristic or attribute values. Application-area information includes information, which may be provided by a user or accessed from a data store, relating to one or more sets of measured or determinable values associated with the presence of a characteristic, at locations in an application area. For example, a DEM includes information representing elevation associated with geographic locations. Thus, a DEM corresponding to an application area will include values representing elevation at a plurality of locations in the application area, and may thus constitute a set of attribute-values for elevation.

In one embodiment, as will be explained, this DEM information may be used to determine a Topographic Wetness Index for the application area.

An index value, like an attribute value, may express a numerical quantity, such as a TWI of 18.7, or a category or classification of a characteristic or attribute, such as "extremely wet." An index value also may be determined from another index value or an attribute value. For example, index values for wetness may be determined from attribute values for elevation, as will be explained in connection to FIG. 6. A set of index values represents an attribute or characteristic. In some embodiments, the set of index values may be characterized as an index grid, which logically overlays an application area, such that the points on the grid correspond to an index value at that location. Such a grid of index values may be represented as a raster, in some embodiments. In some embodiments, a plurality of indices or grids may be used to determine fertilizer application. Therefore in these embodiments, multiple indices or grids of index values, corresponding to multiple characteristics or attributes, may be determined at step 601.

The output of step 601 includes application-area information specifying a set of attribute values or index values, each associated with a location point or discrete land unit in an application area. At a step 701, this information is used to delineate zones of ground, within the application area, encompassing location points or discrete land units with similar associated attribute values. Each location within an application will fall within a zone. For example, if a zone for the wetness index is delineated to include those discrete land units having associated wetness-index values less than or equal to 14, then the remaining discrete land units of the application area will fall within a separate zone having wetness-index values greater than 14. Further details of step 701 are provided in connection to FIGS. 7A through 7C.

At a step 801, one or more nonoverlapping application cells, within the application area, are defined. In one embodiment, the application area is partitioned into one or more application cells. In another embodiment, an application-cell boundaries are determined based on the delineated zones of step 701 and relevant fertilizer application parameters, as will be explained. In this embodiment, application cells are geographically positioned within the application area, based on the location of zones, dimensions of the application area, or fertilizer-application parameters.

As previously explained, an application cell represents a portion of land that will receive a certain product of fertilizer. Further details of step 801 are provided in connection to FIG. 8. As will be explained, in various embodiments, the dimensions of the defined application cells are based on fertilizer-application parameters, which can include equipment parameters or user-defined cell dimensions, the locations of attribute zones, or a combination of fertilizer-application parameters and the locations of attribute zones. Fertilizer-application parameters include fertilizer-applicator equipment parameters that can determine the width of an application cell based, for example, on the reach or coverage area of the fertilizer applicator used to apply fertilizer. The equipment parameters can also determine a minimum application-cell length, based on limitations of the fertilizer applicator to alter fertilizer products as it traverses the application area. In an exemplary embodiment, the width of each application cell will be uniform, but the length will vary based on the location of zones in the application area. In this embodiment, a row of application cells comprises an application strip, which represents one traverse of the application area by a fertilizer applicator. As will be explained in connection to FIG. 8, in one embodiment, application cell length may be determined based on the locations of zones, in order to minimize variance of zones in an application cell, as the cell length increases.

Because every location in an application area will fall within a zone determined in step 701, each application cell will encompass at least a part of a zone. As a consequence, associated with each application cell is zone information about each zone, zones, or zone portions enclosed by the application cell. This information includes the area of the application cell occupied by a zone or a portion of a zone and the zone attributes, indices, and index values associated with the zone.

At a step 901, a schedule specifying fertilizer-application information for each application cell is determined. The schedule can include, in one embodiment, information specifying for each application cell, a product of fertilizer to apply, or a quantity or rate and fertilizer type or types, and a mixture ratio, if a mixture of fertilizer types is to be applied. The zone information associated with each application cell may be used with fertilizer-application parameters to determine the fertilizer-schedule information of each application cell. The zone information associated with each application cell, in step 801, includes attribute or index values associated with a zone that can be used to determine a fertilizer type appropriate for the zone. For example a zone having attribute or index values indicating wetness may be designated to receive an enhanced-type fertilizer. As will be explained, in one embodiment, a fertilizer product determined for an application cell is based on the area of the application cell occupied by a zone or a portion of a zone. For example, in this embodiment an application cell occupied entirely by a portion of a wet zone, might be determined to receive an enhanced-type fertilizer, depending on other fertilizer-application parameters. But an application cell that encloses multiple zones or portions of zones might receive a mixture of fertilizer types, wherein the mixture ratio is proportional to the area occupied by each zone or zone portion within the application cell. In another embodiment, the attribute or index values of location points or discrete land units enclosed by an application cell are used to determine a fertilizer-application schedule indicating a determined fertilizer product for each application cell.

The output of step 901 includes fertilizer-application information. In one embodiment, this comprises a schedule of information relating to a set of application cells, with each cell associated with information indicating location in an application area and a product of fertilizer to be applied to the cell. Additional information relating to attribute-values and information from the fertilizer-application parameters may also be associated with each cell. Further details of step 901 are provided in connection to FIG. 9.

At a step 580, application controller information for a fertilizer applicator is generated. Specifically, the fertilizer-application information outputted from step 901 is used to generate computer instructions for operating a fertilizer-applicator controller to direct fertilizer application by a fertilizer applicator consistent with the fertilizer schedule determined in step 901. Fertilizer-application parameters can include information relating to a fertilizer applicator or a controller used by the applicator, for example, a model number, controller identification, or similar information usable for determining a controller and generating instructions executable by the controller for applying fertilizer. In one embodiment, this includes a table or library of instructions for controlling application by the fertilizer applicator.

In one embodiment, fertilizer-application information is used to create a shape file, which graphically indicates the locations of application cells in an application area and the determined fertilizer product for each cell. The determined fertilizer product may be indicated by color, shading, or similar visual reference, as shown in Stage 5 of FIG. 3 or the left-hand side of FIG. 2E, for example. Using a library of instructions for a controller, the shape file is then converted to an appropriate file format for execution by the controller.

The fertilizer (or agrochemical) application is location dependent; each cell is associated with a location in the application area. Accordingly, in one embodiment, controller instructions include an product of fertilizer to apply for a given application cell and an associated location information, which may define the boundaries (or merely the cell length) of that application cell. In an embodiment having uniformly sized application cells, controller instructions may correspond to a listing of fertilizer products such that a controller applies a product specified on the list for a certain duration or distance. In one embodiment, location information may be present via the fertilizer applicator and the applicator controller may receive location information in real-time (or near real-time) to determine an immediate product of fertilizer to apply based on that received location.

At a step 540 the schedule of step 901, including the fertilizer-application information, may used for subsequent analysis, in one embodiment. The fertilizer-application information may also be stored, and overtime become part of a set of historical information, which can be used in future fertilizer application sessions or analysis, in some embodiments. Analysis may also be performed using the schedule or other fertilizer application information from step 901. By way of example, fertilizer application information may be used to generate a table or listing of fertilizer application products for each cell or geographic map of the application area showing each application cell associated with a product of fertilizer to be applied to that cell. Fertilizer products to be applied to each cell may be indicated by color-coding, shading, text, outlining, or similar means. In one embodiment, fertilizer application parameters, such as user-provided information, date or time information, regulatory information, fertilizer costs, near-by geographical features, or crop-related information are included on the map or automatically placed with the map into a report that details recommended variable-product fertilizer (or agrochemical) application. This information may, in one embodiment, be stored in a file, viewed, and printed. In another embodiment, a user may export a map showing fertilizer application as a shape file or similar format, which then can be used as a map layer with other information such as crop-yield maps. In another embodiment, a table or geographic map indicating fertilizer products for each application cell is generated with information indicating economic information such as the cost of fertilizer for each cell or the total fertilizer cost, an estimated differential crop-yield resulting from applying one determined product vs. another determined product of fertilizer for an application cell, expected profit from crops or a cost-benefit analysis, which compares the cost of applying a determined product of fertilizer vs. the estimated crop yield or profit corresponding to an application of the determined product of fertilizer, for an application cell. In other embodiments, additional information may be included on a geographic map or table indicating a fertilizer product for each application cell, such as: attributes or characteristics of the application area, as shown in the right-hand side of FIG. 2E; historical information representing past fertilizer applications or past crop yields; an indication where user-preference deviates from determined fertilizer products for each application cell; an identification of total fertilizer quantities, brands, types, rates, or mixture ratios; applicator equipment information; or government regulations. Such additional information may be geographically referenced on the map where appropriate, in some embodiments. By way of example, consider an application cell that would otherwise be determined to require a certain product of fertilizer, but because of a fertilizer application parameter such as a government regulation or user-specified buffer, a different product of fertilizer has been determined. Information representing this can be represented on the map, and geographically referenced to the application cell or cells to which it applies. In one embodiment, an asterisk may be placed on a cell and below the map the asterisk may correspond to information affecting that cells determined product of fertilizer, such as a message indicating that the fertilizer product determined for the cell is affected by a user-designated buffer. Other combinations of information, representing fertilizer-application information including the determined product of fertilizer, historical information, and application area information, may be visually presented on a user interface as a geographically referenced map of an application area suitable for use by a grower, fertilizer distributor, or user to facilitate determining or analyzing a fertilizer application strategy.

Turning now to FIG. 6, a flow diagram is shown illustrating an exemplary method of determining attribute values or index values, according to an embodiment, shown as 600. At a step 610 application area information is received. As explained previously, application-area information generally comprises attribute-related information associated with location information, which may be geographically-referenced or relatively-referenced location information, such as locations based on the boundaries of the application area, a common point of reference, or other local locations. Application area information may be received directly from a user or from a data store, either locally or online. Application area information may be received within a defined input-window, at any time, or as needed, including subsequently to determining a grid or set of attribute values or index values, such as in cases where attribute values or index values are determined based on other attribute values or index values. In one embodiment, a user provides field records, measurements, lab data, or similar information directly via a user interface. In another embodiment, application area information is received from a data store, where it may be accessed according to location information related to the application area. For example, in one embodiment, application area information is accessed from a GIS or similar database, using information related to the geographical location of the application area, such as coordinates specifying its boundaries.

At a step 620, a set or grid of attribute values is determined. Alternatively, in one embodiment, a set or grid of index values is determined. Application-area information may be received already as a set of attribute-related information associated with location points or discrete land units in the application area. For example, application-area information may be received as a heatmap, raster, table, or similar format that associates values of an expression of a characteristic to locations in an application area. Thus the received application-area information already may be in a format suitable for use as a grid or set of attribute values. In some embodiments, it is not necessary to determine a grid of attribute values or index values as described in connection to step 620. Rather in some embodiments, the application area information, received in step 610, already specifies one or more sets of attribute values or index values sufficient for delineating zones. In other embodiments, a set or sets of attribute values may be further processed to determine other attribute values used for delineating attribute zones. For example, a set of attribute values corresponding to elevation and a set of attribute values corresponding to residue cover may be used together to determine a set of attribute values representing TWI for the application area.

In some embodiments, attribute values may be processed to be become index-values. In some embodiments, attribute values or index values may be determined from this received set of attribute-related information associated with location points or discrete land units in the application area. By way of example, received DEM information for an application area includes elevation information associated with the locations discrete land units, specified by the resolution of the DEM. This information is suitable for use as a set or grid of attributes for elevation, or it may be subsequently processed for determining wetness-index values associated with each discrete land unit. In another example, received field data, such as measurements of application area characteristics, may already include location information associated with each measurement value, which may be used as an attribute or index value.

Alternatively, in some embodiments a grid or set of attribute values, or index values, for an application area must be determined by identifying discrete land units and their locations or identifying location points, determining a value representing an attribute at the location point or location of the discrete land unit, and associating that attribute value with the location point or discrete land unit. A discrete land unit size may be specified by a user or by the application-area information. For example DEM information includes a resolution, which is indicative of the size of discrete land units having the elevation attribute. For example, a 10 m DEM has an elevation value associated with each 10 meter-square area. If multiple attribute values are present in a discrete land unit, an average, median, or otherwise representative value may be used as the attribute value. Alternatively, the discrete land unit may be subdivided into smaller discrete land units, such that each discrete land unit is associated with one of the attribute values.

In one embodiment, an attribute or index to be used for determining a set of attribute values or index values may be specified by fertilizer-application parameters. In one embodiment, fertilizer-application parameters include an attribute preference received from a user. The user may select the attribute or index via a user interface or may indicate a preference or selection related to fertilizer application that inherently specifies an attribute. In one embodiment, a previously selected or previously considered attribute is used as a default selection. In one embodiment, the user may be prompted to make a selection, or a user may be presented with previously considered attributes. In one embodiment, an attribute is determined based on available application-area information. For example, where application area information only corresponds to acidity or alkalinity, a soil pH-level attribute would be used. In another embodiment, fertilizer-application parameters relating to available fertilizer inventory, fertilizer costs, or regulations are used to determine an attribute. In the case where multiple attributes are possible, a user may be presented with a list to select from, via a user interface. Alternatively, attributes may correspond to a priority, ranking preferred attributes.

FIG. 6 illustratively provides an exemplary embodiment for determining a grid of attribute values, or index values, in step 620. In this embodiment, a Topographic Wetness Index grid is determined. At a step 625 DEM information corresponding to an application area is determined. The DEM information may be part of a library or GIS database, in one embodiment, and accessible via a data store. A user specifies the DEM information that corresponds to the application area via a user interface, in one embodiment, by defining a boundary of an area in the DEM corresponding to the application area. In one variation of this embodiment, a user interface may be designed or provided using ArcMap. The interface can permit a user to view an aerial depiction of land, such as a satellite or aerial image, that includes the application area, and enable the user to draw a boundary around the application area. Upon completing drawing a boundary around the application area, the user can click a button to automatically determine DEM information corresponding to the area enclosed by the user-defined boundary. A further variation of this embodiment adds a buffer area around the user-defined boundary. In another embodiment, a user may provide coordinates of the boundary of an application area or specify an application area with known coordinates usable for identifying corresponding DEM information. In one embodiment, DEM information corresponding to an application area is determined automatically from available application area information. In one embodiment, a user is also prompted to specify the type or resolution of DEM information to be used for the DEM. The DEM information provides elevation values for discrete areas of ground. For example, a 10-meter DEM provides an elevation for each 10-meter-square area of ground. Thus each 10-meter-square area of ground represents a discrete land unit, and the elevation represents an associated attribute value.

At step 635, step 645, and step 655, processing is performed on the DEM information to determine flow direction grid, a flow accumulation grid, and a slope grid, respectively. A flow direction grid created in step 635 is a raster dataset representing flow direction from each discrete land unit to its steepest downslope neighbor. The output of step 635 is an integer raster with values ranging from 1 to 255. At step 645 a flow accumulation grid is created. A flow accumulation grid is a raster dataset representing accumulated flow to each discrete land unit, as determined by accumulating the weight for all discrete land units that flow into each downslope discrete land unit. Discrete land units having undefined flow direction may only receive flow; they will not contribute to any downstream flow. At step 655 a slope grid is created, which identifies the rate of maximum change in z-value for each discrete land unit.

A step 660 determines whether to use additional application-area variables for determining TWI values. These include variables for predicting relative spatial variability in wetness such as vegetation, soil structure, depth to impermeable layer, and residue cover. The decision to use these variables may be specified by the fertilizer application parameters, or may be made automatically when application-area information corresponding to these variables is available. At a step 665, the additional variables are determined. In one embodiment, these variables include an attribute value associated with a location point or discrete land unit and may be determined as described in connection to step 620, above.

At a step 670, a TWI grid is created. TWI is used to quantify hydrological processes. For example, as previously explained, TWI can provide a likelihood of accumulation of water within a region. In one embodiment, TWI combines local upslope contributing area and slope information and is defined as:

TABLE 2

$$\ln(A_s/\tan\beta)$$

where $A_S$ is the flow accumulation or upslope contributing area per unit grid-cell width (m²/m) and $\tan\beta$ is the land slope in degrees.

In one embodiment, the processes corresponding to steps 625, 635, 645, 655, and 670, discussed above, may be carried out using computer-readable instructions written in Visual Basic or Python and using a library of GIS software functions such as ArcGIS developed and released by Environmental Systems Research Institute (ESRI) of Redlands, Calif. Thus for example, at step 625, a DEM area corresponding to an application area is determined from a user-defined boundary of the application area according to the following instructions:

TABLE 3

```
# Process: Clip...
gp.Clip_management(rasdata, Rectanglea, clipdata, rasdata)
InFlowD = "NORMAL"
InType = "DEGREE"
```

At step 635, a flow direction grid is created according to the following instructions:

TABLE 4

```
#Process: FlowDirection
gp.FlowDirection_sa(clipdata, flowd, InFlowD)
```

At step 645, a flow accumulation grid is created according to the following instructions:

TABLE 5

```
# Process: Flow Accumulation
gp.FlowAccumulation_sa(flowd, flowa)
```

At step 655, a slope grid is created according to the following instructions:

TABLE 6

```
# Process: Slope
gp.Slope_sa(clipdata, fslope, InType)
RadDeg = "57.296"
#Process Slope and multiple it by a conversion unit
gp.Divide_sa(fslope, RadDeg, fslopedeg)
#Process Contributing slope
gp.Con_sa(flowa, 100, conta)
#Constant values
Input_raster_or_constant_value_2 = "100"
Input_raster_or_constant_value_plus = "1"
# Process Contributing Area
gp.Plus_sa(flowa, Input_raster_or_constant_value_plus, flowa2)
gp.Times_sa(flowa2, Input_raster_or_constant_value_2, conta)
```

And at step 670, a TWI grid is created according to the following instructions:

TABLE 7

```
# Topographic Wetness Index
oTan = "outtan"
dTan = "dtan"
topowi = "wetindex"
Inttopowi = "Int_twi"
twiclass = " wi_class"
gridpoly = " wipoly.shp"
tabclass = " UPDATED_TABLE"
recltab = " wirec"
# Process Tangent
gp.Tan_sa(fslopedeg, oTan)
# Process Divides
gp.Divide_sa(conta, oTan, dTan)
# Process TWI
gp.Ln_sa(dTan, topowi)
# Processing Topographic Wetness Index to an Integer"
gp.Int_sa(topowi, Inttopowi)
# Reclass data
gp.ReclassByASCIIFile_sa(Inttopowi, rec_2_txt, recltab, "DATA")
```

FIGS. 7A, 7B, and 7C illustratively provide exemplary methods for delineating zones according to embodiments of the present invention, and are shown as 710, 720, and 730 respectively. Generally as shown in methods 710, 720, and 730, attribute zones or index zones are delineated based on a received set of attribute values or index values, which in some embodiments may be received as a grid of attribute values or index values. Although the steps of methods 710, 720, and 730 may illustratively depict using attribute values or index values, it is understood that, at least in methods 710, 720, and 730, an attribute value may be used in place of an index value, and vice versa. This is not to say that an attribute value equals an index value, which is not necessarily true. Similarly, attribute values or index values may be received in the form of a grid or a set of values, including a table of values and a raster data set. Thus, for example, steps 712, 722, and 732 may receive attribute values or index values, as either a set of values or as a grid.

In some embodiments, multiple iterations of methods 710, 720, or 730 will be performed resulting in a set of attribute zones or index zones, with each member of the set corresponding to all of the zones for a particular attribute or index, such as all of the TWI zones or all of the zones for soil-pH level.

Turning now to FIG. 7A, at a step 712, a grid of attribute values is received. Attribute values may be received from a step of determining attribute values or index values, such as step 600 of FIG. 4 or step 601 of FIG. 5; received from a user via a user interface, or received from a data store of application-area information. In one embodiment, the grid of attribute values received in step 712 comprises a raster dataset. At a step 714, polygon shape files are created based on the grid of attribute values. A polygon shape file is a graphic representation of an attribute value associated with a discrete land unit; each shape file has a polygon value corresponding to an attribute value. By way of example, a set of attribute values for an application area may be graphically represented as a geographically referenced raster-image, heat map, or similar visual depiction of discrete land units that are color coded, shaded, or marked to represent attribute values. This graphical representation may be converted to an image format, in one embodiment, such that information is stored as a bitmap-type image. The output of step 714 thus comprises a set of polygon shape files, with each shape file having a polygon value corresponding to the received set of attribute values.

At a step 716, adjacently positioned, substantially similar shape files are merged together to form an attribute zone. In one embodiment, polygon values of adjacent shape files are compared, and where adjacent shape files are found to be identical or within a certain threshold indicating substantial similarity or classification, the shape files are merged. In one embodiment, this threshold is determined from a fertilizer-application parameter, which might include threshold information received from a user. In another embodiment, a threshold is determined based on the range of values of the received index values or attribute values; for example, a threshold may be determined based on a standard deviation of index values or attribute values. In still another embodiment, image processing is performed on adjacent shape files to identify and merge adjacent shape files having similar color or shading. The output of step 716 includes one or more delineated zones representing areas of similar characteristics; embodiments can include one or more shape files corresponding to each zone, or a data structure of zone-boundary locations and associated attribute values or a classification of attributes of each zone.

In one embodiment, the processes corresponding to steps 714 and 716 may be carried out using computer-readable instructions written in Visual Basic or Python and using a library of GIS software functions. Accordingly, at step 714, polygon shape files are created from a grid of attribute values according to the following instructions:

TABLE 8

Convert the TWI Raster data to a polygon shapefile
rasterfId = "VALUE"
gp.RasterToPolygon_conversion(recltab, gridpoly, "SIMPLIFY", rasterfId)
wipoly_Dissolve_shp = "wipolydis.shp"
wipoly_shp = "wipolydis.shp"

And at step 716, adjacent shape files representing substantially similar characteristics are merged together to form one or more zones according to the following instructions:

TABLE 9 gp.Dissolve_management(wipoly_shp, wipoly_Dissolve_shp, "GRIDCODE", "", "MULTI_PART")

Turning to FIG. 7B, another method for delineating zones according to embodiments of the present invention is illustratively provided. At a step 722, attribute values are received. Attribute values may be received as a set or grid of attribute values from a step of determining attribute values or index values, such as step 600 of FIG. 4 or step 601 of FIG. 5; received from a user via a user interface, or received from a data store of application-area information. At a step 724, discrete land units associated with the received attribute values are identified. Processing for delineating a zone is performed on discrete land units, in the embodiment provided by FIG. 7B, thus step 724 identifies the discrete land units associated with each received attribute value. At a step 726, adjacently positioned discrete land units associated with identical attribute values are merged to form subzones. The output of step 726 includes one or more subzones made up of discrete land units that have the same attribute value. Thus each created subzone becomes associated with the attribute value of its component discrete land units. In one embodiment, the subzones determined in step 726 are used as delineated zones.

At a step 728, adjacently positioned subzones that have substantially similar attribute values are merged together to form a delineated attribute zone. A threshold may be used to indicate substantial similarity. In one embodiment, this threshold is determined from a fertilizer-application parameter, which might include threshold information received from a user. In another embodiment, a threshold is determined based on the range of values of the received index values or attribute values, for example, a threshold may be determined based on a standard deviation of index values or attribute values. In another embodiment, a cluster analysis of values of subzones may be performed to determine zones based on clusters of subzones.

In another embodiment, subzones associated with attribute values corresponding to the same attribute classification are merged together to form a delineated attribute zone. By way of example, for the soil pH-level attribute, subzones associated with pH-levels less than 7 might be merged into a zone corresponding to "acidic," since the attribute values associated with each subzone correspond to the same attribute classification, (i.e., "acidic"). This embodiment contemplates a scenario where substantially similar attribute values or index values represent different attribute or index classifications, and thus are not included in the same zone. By way of example using the pH-level attribute again, attribute values of 6.9 and 7.1 might be considered substantially similar, in that both values are close to a neutral pH-level, and therefore according to the previously described embodiment, their associated discrete land units (or location points) would be included in the same zone. But because an attribute value of 6.9 is considered acidic and an attribute value of 7.1 is considered basic or alkaline, under this embodiment, the discrete land units associated with the two attribute values might fall into different zones. This embodiment also contemplates a scenario where zones are formed based on attribute values of discrete land units (or location points) falling into ranges of attribute values. For example, in one embodiment, a TWI can be divided into 7 ranges: (1) less than 10.4, (2) 10.4-12.1, (3) 12.1-13.8, (4) 13.8-15.6, (5) 15.6-17.3, (6) 17.3-19, and (7) greater than 19, corresponding to the following classifications: extremely dry, very dry, dry, moderate, wet, very wet, and extremely wet, respectively.

Turning to FIG. 7C, another method for delineating zones according to embodiments of the present invention is illustratively provided. At a step 732, attribute values are received. Attribute values, which may be in the form of index values, may be received as a set or grid of attribute values from a step of determining attribute values, such as step 601 of FIG. 5; received from a user via a user interface, or received from a data store of application area information. In another embodiment, instead of receiving attribute values, index values may be received at step 732. At a step 734, location points associated with the received attribute values (or index values, in one embodiment) are identified. Processing for delineating a zone is performed based on the location points in the embodiment provided by FIG. 7C, thus step 734 identifies the location points associated with each received attribute value.

At a step 736, adjacently located location points associated with identical attribute values (or index values, in one embodiment) are enclosed to create subzones. In one embodiment, a subzone boundary is delineated between location points associated with non-identical attribute values (or index values). In one embodiment, the boundary may be positioned at a location evenly spaced between location points associated with different attribute values (or index values). The output of step 736 includes one or more subzones enclosing location points that are associated with identical attribute values (or index values). Thus each created subzone becomes associated with the index value (or attribute value) of its enclosed location points. In one embodiment, the subzones determined in step 736 are used as delineated zones.

At a step 738, adjacently positioned subzones that have substantially similar attribute values (or index values) are merged together to form a delineated attribute or index zone. A threshold may be used to indicate substantial similarity. In one embodiment, this threshold is determined from a fertilizer-application parameter, which might include threshold information received from a user. In another embodiment, a threshold is determined based on the range of values of the received index values or attribute values, for example, a threshold may be determined based on a standard deviation of index values or attribute values. In another embodiment, a cluster analysis of values of subzones may be performed to determine zones based on clusters of subzones.

In another embodiment, described above in connection to FIG. 7B, subzones associated with index values corresponding to the same index classification, or subzones associated with attribute values corresponding to the same attribute classification are merged together to form a delineated index zone or attribute zone, respectively.

Each zone may be considered to be associated with an attribute value or an index value representative of the attribute values or index values associated with the discrete land units or location points within the zone. Embodiments of the representative value include an average value, a median value, or a value otherwise representative of the attribute values or index values associated with each discrete land unit or location point in the zone.

Figure 8:
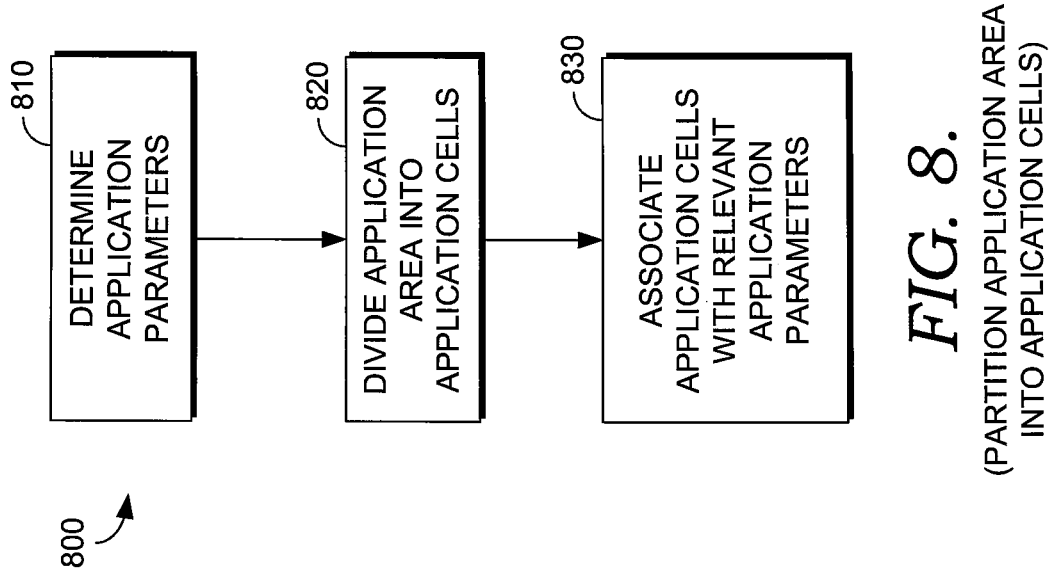
FIG. 8 depicts a method by which the present invention may be used in order to partition an application area into application cells.

FIG. 8 is a flow diagram illustrating an exemplary method for partitioning or dividing an application area into application cells according to an embodiment, shown as 800. As previously described, application-cell dimensions may be determined based on fertilizer-application parameters, including user preferences and equipment parameters that may specify the physical reach or other limitations of a fertilizer applicator, the size of the application area and the locations of zones.

At step 810, fertilizer-application parameters are determined. Examples of fertilizer-application parameters are discussed previously in connection to FIG. 1. Fertilizer-application parameters may be received from a user via a user interface, from a data store, or both. In one embodiment, a set of fertilizer-application parameters is determined based on application-area information, historical information, or both. By way of example, determined attribute values may correspond to a certain fertilizer type or application methodology. In one embodiment, application parameters are determined by a series of questions, text fields, or selections completed by a user through a user interface. This embodiment might prompt the user to provide information relevant to determining application parameters including, for example information about the user's applicator or equipment, fertilizer inventories, other user preferences, storage locations of data related to fertilizer application, such as the location or path to the location of application-area information and historical information, including past user settings or preferences. One embodiment might prompt the user for this information using a user interface and a series of questions, similar to a user interface and series of questions provided by income tax software. Moreover, a user's entries may be saved and reused during subsequent sessions. In one embodiment, application parameters may be downloaded from one or more servers, as needed. For example, in one embodiment, information including updated information, related to federal and state regulations, current fertilizer prices or crop futures, or recommended application rates or ratios is retrieved as needed from a data store. In one embodiment, a set of application parameters may be provided by an applicator manufacturer or a fertilizer retailer. In one embodiment, fertilizer application parameters includes a TWI threshold, which may be provided by a user or determined using TWI-related application area information and historical information including differential yield performance (i.e., past yield from enhanced fertilizer minus a past yield from conventional fertilizer). The TWI threshold can be determined to insure a positive yield differential.

In some embodiment, fertilizer application parameters include a risk-avoidance level, which is usable to scale or adjust fertilizer application products. For example, the risk-avoidance level parameter can be applied to an attribute threshold to slide the threshold up or down, thereby altering the determined fertilizer product to be applied. More specifically, suppose application parameters include an attribute threshold for TWI representing a TWI value of 17.3 or more. This threshold could indicate that an attribute zone is designated to receive an enhanced fertilizer is only if the attribute value (a TWI value, here) representative of the zone is 17.3 or more. Suppose further that a user, wishing to avoid the risk of loss of conventional fertilizer due to environmental loss mechanisms, provides a high risk avoidance level (or indicates a low tolerance for risk), which could be specified by the user as a number or percentage representing risk the user is willing to take, as a category of risk like low, medium, or high, a slider bar ranging from low to high risk, or a question to the user. This provided risk-avoidance level may be used to adjust the TWI threshold down to a lower level, which would result in zones having corresponding attribute values lower than 17.3, but higher than the newly adjusted TWI threshold, being designated for receiving enhanced fertilizer. In other words, zones that are wet, but below the original TWI threshold may still receive an enhanced fertilizer application.

In some embodiments, fertilizer application parameters includes one or more buffers, which indicate areas of land that will not receive fertilizer, such as areas of land adjacent to wells or water resources. The buffers or parameters used to determine buffers may be provided by a user or determined automatically from application-area information, such as information about water resources within the application area.

At a step 820, the application area is divided into application cells. As previously described, in connection to step 800 of FIG. 4 and step 801 of FIG. 5, an application area may be partitioned into one or more application cells, or the boundaries for one or more application cells may be defined within an application area. A set of fertilizer-application parameters includes a subset of equipment parameters that may determine the dimensions of an application cell based, for example, on the reach or coverage area of a fertilizer applicator used to apply fertilizer. In one embodiment, dimensions of an application cell are based only on equipment parameters, and each application cell has a uniform dimension. A minimum discrete cell length may be determined based on equipment parameters related to limitations of an applicator's capability to vary fertilizer application. This length represents the smallest amount of distance that the applicator can effectively vary application of different fertilizer products, while traversing an application area, or the smallest amount of distance that must be traversed in order to differentiate an applied fertilizer product.

In one embodiment, the width of each application cell will be uniform, based on equipment parameters, but the length will vary based on equipment parameters and the location of zones in the application area. In this embodiment, a row of application cells comprises an application strip, which represents one traverse of the application area by a fertilizer applicator. A cell length may be determined based on the minimum discrete cell length discussed above and zones or portions of zones falling into the minimum discrete cell length, in order to minimize variance of zones in an application cell, as the cell length increases. Specifically, an application cell's length may be extended based on the location of zones relative to the application cell. Fertilizer-application products are ultimately determined based on attributes, in one embodiment, which the zones represent. For a given cell, portions of zones falling in the cell may vary, thus fertilizer product will vary for each cell. Accordingly, cell length may be determined to maximize the area of a cell that minimizes the variance in zones or portions of zones within the cell. Put another way, beyond the minimum discrete length, the cell length should continue so long as the proportion of areas occupied by a zone, zones, or portions of a zone or zones within the cell is substantially constant, in one embodiment. For example, application strip 257 illustrated in FIG. 2A, includes application cells 255 of varying cell length, based on the location of zones, in order to minimize zone-variance in each application cell.

Each cell encompasses at least part of at least one zone, thereby associating information about the zone and its associated attribute values with the cell. In one embodiment, the output of step 820 includes information about each application cell, including application cell size and location, and the associated zone and zone-attribute information. At a step 830, application parameters are associated with application cells. The information provided by step 830 may be used to determine a fertilizer product for each application cell. The information provided by step 830 includes information specifying each application cell and information associated with each cell including zone and zone-attribute information, and any fertilizer-application parameters relevant to determining a fertilizer product for each cell. By way of example, an application parameter specifying a buffer along one side of an application area may be associated with application cells located on that side of the application area. In one embodiment, the output of step 830 may include a data structure of application cells and associated zone and zone-attribute information, and relevant fertilizer-application parameters.

Figure 9:
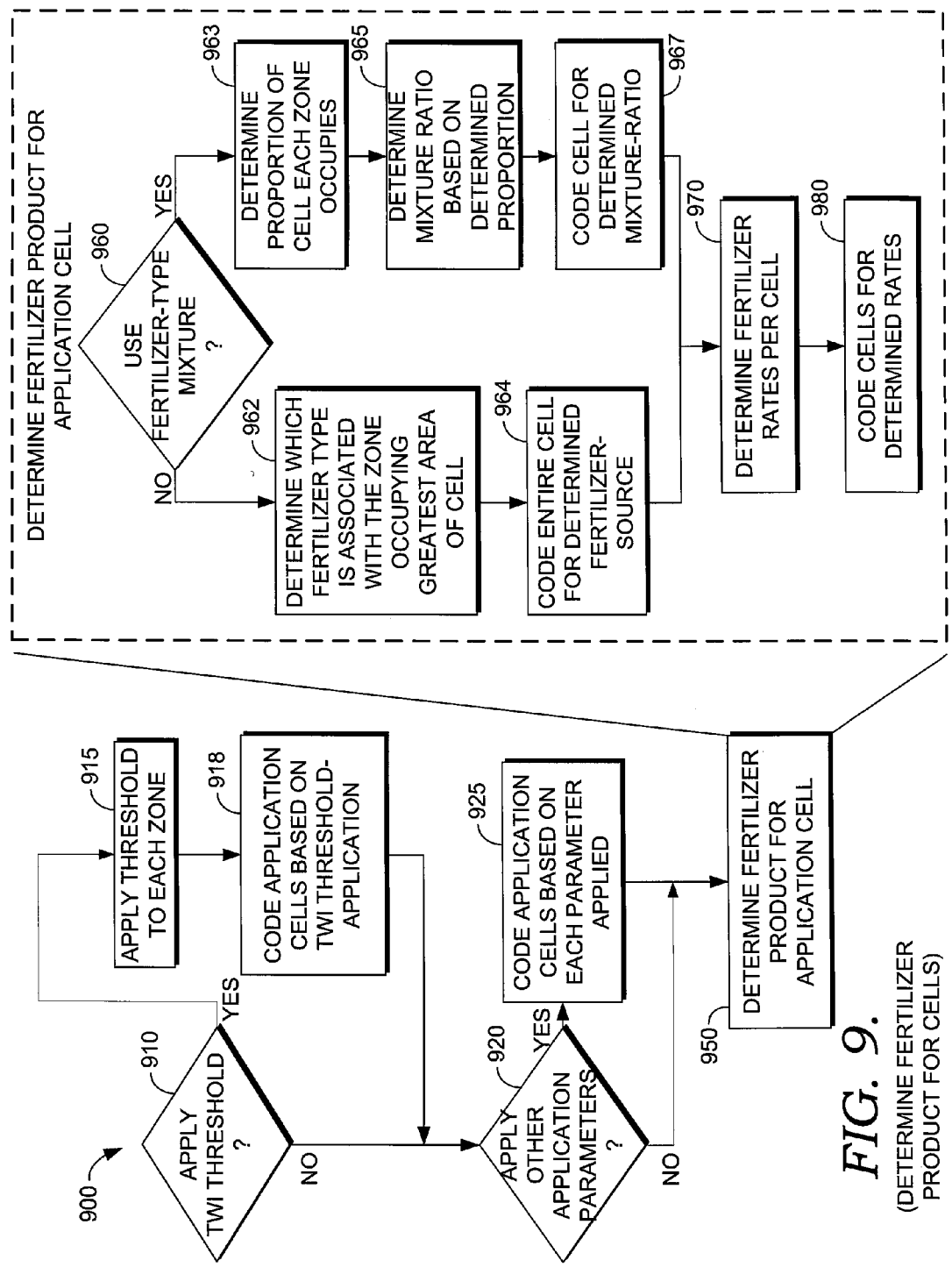
FIG. 9 depicts a method by which the present invention may be used in order to determine a fertilizer product for applying to an application cell.

Turning now to FIG. 9, a flow diagram is shown illustrating an exemplary method for determining a fertilizer product for each application cell, shown as 900. As previously described, a fertilizer product can include the type or types of fertilizer, fertilizer application rate or quantity, and fertilizer-mixture information such as a proportion of mixed fertilizer types. In one embodiment, fertilizer products may be determined based on attribute values associated with zones or portions of zones falling within each application cell and based on fertilizer-application parameters. In one embodiment, the attribute values (or index values) of location points or discrete land units enclosed by an application cell are used to determine fertilizer product. As described above in connection to FIG. 8, the information provided by step 830 may be used to determine a fertilizer product for each application cell. In one embodiment, this information includes information associating each application cell with zone and zone-attribute information for the zones or portions of zones in the cell and relevant fertilizer-application parameters.

At a step 910, a decision is made regarding whether to apply a TWI threshold. An attribute threshold or attribute-value threshold, such as a TWI threshold, may be included in a set of fertilizer application parameters determined in step 810, of FIG. 8. An attribute threshold is used to determine which fertilizer type or types to apply based on the attribute value or index value associated with a zone, in one embodiment. In another embodiment, an attribute threshold may be used to determine which fertilizer type or types to apply based on the attribute value or index value that are enclosed by an application cell. Attribute values not satisfying the threshold may be ignored, altered, zeroed out, or effectively considered to have a different attribute value. By way of example, consider a TWI threshold requiring a TWI value of 17.3 or more for an enhanced-type fertilizer, and another application parameter specifying that an enhanced-type fertilizer is to be applied to zones having associated TWI values of greater than 15.6, which corresponds to wet, very wet, and extremely wet antecedent soil-moisture conditions. A zone having an associated TWI value of 16 would be considered for receiving an enhanced-type fertilizer, without the TWI threshold. But with the TWI threshold applied, the zone would not be considered for receiving an enhanced-type fertilizer.

The decision to apply a TWI threshold in step 910 is determined based on a wetness-index threshold included in the set of determined fertilizer-application parameters. Applying a TWI threshold is discussed in connection to steps 915 and 918. At step 915, the TWI threshold is applied to each zone or portion of a zone within an application cell. In one embodiment, the threshold is applied to an attribute value or index value representative of the zone. In another embodiment, the TWI threshold is applied to the attribute value or index value associated with each discrete land unit or location point within the zone or zone-portion falling within the application cell. Based on the result of the threshold application, the zone or portion of zone falling within the application cell is designated to receive a fertilizer type. In one embodiment, the zone or zone-portion falling within the application cell are designated as receiving either a conventional-type fertilizer or an enhanced-type fertilizer, based on whether attribute values or index values associated with each zone are below or above the TWI threshold. In another embodiment, the zone or zone-portion falling within the application cell are designated as receiving either a conventional-type fertilizer or an enhanced-type fertilizer, based on whether a majority of attribute values or index values associated with discrete land units or location points within the zone or zone-portion falling within the application cell are below or above the TWI threshold. In one embodiment, the set of determined fertilizer-application parameters also includes a risk-avoidance level. A risk-avoidance level, which is described above in connection to FIG. 8, may be used to scale the TWI threshold (or other attribute threshold) prior to applying the threshold to each zone, based on the user's tolerance for risk, such as the risk of loss of conventional fertilizer due to environmental loss mechanisms, which is expressed by the risk avoidance level parameter.

At step 918, each application cell is associated with information indicating the fertilizer type designated for each zone or zone-portion falling within the application cell, based on the operation performed in step 915.

Continuing with FIG. 9, at a step 920 a decision is made regarding whether to apply other fertilizer-application parameters. The decision to apply other fertilizer applications is determined based on parameters present in the set of determined fertilizer-application parameters. If another application parameter is to be applied, then at a step 925, application cells are coded for or associated with information based on an application of the parameter. For example, a set of fertilizer-application parameters may include a mixed-types parameter for indicating whether an application cell may receive a single type of fertilizer or a mixture of fertilizer types. If a mixed-types parameter is present and indicates that a cell is permitted to receive only a single fertilizer type, then at step 925, that cell is coded for or associated with information indicating that only a single fertilizer type may be applied to the cell.

At a step 950, a fertilizer product is determined for each application cell. In one embodiment, the product is determined based on fertilizer-application parameters specifying the fertilizer type or types, quantities, or mixture ratios to be applied for a given attribute value or range of attribute values, based on attribute values or index values associated with zones or zone portions within the application cell. In one embodiment, these application parameters include user preferences of fertilizer application or recommended application products, which may be received from a fertilizer retailer. In one embodiment, the attribute values of location points or discrete land units enclosed by an application cell are used to determine a fertilizer product. In this embodiment, a product may be determined based on fertilizer parameters and an average, median, or representative value of the attribute values associated with discrete land units or location points within an application cell.

One embodiment of step 950 is provided on the right-hand side of FIG. 9. In this embodiment, a fertilizer type may associated with each zone within the application cell, based on fertilizer-application parameters. The fertilizer type may be determined based on a representative attribute value or index value associated with the zone or based on attribute values or index values of discrete land units or location points within the zone.

At a step 960, a decision is made regarding whether an application cell is permitted to receive a mixture of fertilizer types. The decision is determined based on whether the cell was coded or associated with information provided by a mixed-types parameter, at step 925. As previously explained, a mixed-types parameter may indicate whether the cell is permitted to receive a single fertilizer type or mixture of types.

If the application cell is not permitted to receive a mixture of fertilizer types, then at a step 962, it is determined which fertilizer type is associated with the zone or portion of a zone occupying the greatest area of the application cell. By way of example, if a cell includes two zones, a first zone occupying 60% of the application cell and a second zone occupying 40 percent of the application cell, then the fertilizer type associated with the first zone is determined. At a step 964, the application cell is coded for receiving, or associated with, the fertilizer type determined in step 962.

On the other hand, if a cell may receive a mixture of fertilizer types, then at a step 963 a proportion of area within the application cell occupied by each zone or portion of a zone is determined. In one embodiment, step 963 first determines how many zones or zone portions fall within an application cell. In one embodiment, a mixture of fertilizer types is applied only to application cells enclosing more than one zone or zone-portion. Thus, where only one zone is within an application cell, the application cell will receive only fertilizer associated with that zone, regardless of whether the cell is permitted to receive a mixture. Accordingly, if only one zone or portion of a zone is present in the application cell, then that zone is determined to occupy 100% of the application cell, in this embodiment.

If more than one zone or zone-portions is within the application cell, then the area of the application cell occupied by each zone is determined. At a step 965, a mixture ratio of fertilizer types is determined based on the proportion of areas determined in step 963. As described above, in this embodiment, each zone has a fertilizer type associated with it. Accordingly, in one embodiment, the fertilizer types used for the mixture ratio determined in step 965 are the fertilizer types associated with each zone falling within the application cell, or with a zone portion falling within the application cell. The ratio may correspond to the proportion determined in step 963, in one embodiment. By way of example, assume that a cell includes two zones: one zone that has a low TWI value and occupies 60% of the application-cell area, and another zone that has a high TWI value and occupies the remaining 40% of the application-cell area. Assume also that a mixed-types parameter indicates that a mixture of fertilizer types is permissible. Then according to one embodiment the mixture ratio of fertilizer types to apply may be determined based on the proportional areas occupied by each zone. Here, the ratio might be 60% conventional fertilizer to 40% enhanced fertilizer. At a step 967, the application cell is coded for receiving, or associated with, the fertilizer type or types and mixture ratio, where applicable, determined in step 965.

At a step 970, a rate of fertilizer is determined for each application cell. A rate is an amount per unit area of land; thus in determining the rate, the quantity or amount of fertilizer to be applied to an application cell can be determined. A rate of fertilizer to apply to the cell is based on a set of fertilizer-application parameters. Where a mixture of fertilizer types is to be applied, a rate may be determined for each component fertilizer type, in one embodiment. In another embodiment, a rate for a mixture of fertilizer types may be determined from the application parameters. At a step 980, each application cell is coded for receiving, or associated with, the rate determined in step 970.

Having thusly described illustrative embodiments for facilitating methods for applying agrochemicals to an application area and managing agrochemical application, it will be apparent to one of skill in the art that such embodiments can be used for in many possible applications including, for example: applying anhydrous ammonia with and without nitrification inhibitor, depending on attribute values; applying other fertilizer sources such as P fertilizer, with and without Avail; applying liquid forms of conventional versus enhanced efficiency fertilizers; applying N fertilizer sources based on soil textural differences detected by measuring soil ECa; using other soil or landscape characteristics to improve estimates of TWI (e.g., depth to impermeable layer, residue cover, soil texture, vegetation, soil structure); or incorporating other factors that may affect location and type of fertilizer applied such as environmental regulations, health and safety, and other economic considerations.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. By way of example, another land or soil attribute that can be used for delineating zones of land for receiving different fertilizer- or agrochemical-product applications is soil texture and differences in soil texture that may exist across a field. An attribute value representing soil texture can be a quantitative variable (i.e., % sand, % silt, and % clay) or can be a categorical metric based on soil textural classes (e.g., silt loam). The soil-texture attribute can be measured by several methods including (a) taking grid soil samples and analyzing each sample for soil texture, and (b) using an on-the-go field-based sensor such as apparent electrical conductivity (ECa) or a near-infrared (NIR) sensors. Such field sensors provide indirect measures of soil texture, but using calibration information, their measurements are interpretable into quantifiable soil texture information. From the obtained attribute values, fertilizer or agrochemical product application decisions can be based, for example, on a percentage of a sand (e.g., for N applications) or % clay (for P applications), in one embodiment. Here, a higher percentage of sand might result in a higher quantity of enhanced efficiency N fertilizer to be applied; or a higher percentage of clay might result in a higher quantity of enhanced efficiency P fertilizer to be applied, depending on other application-area information and application parameters. Like wetness, application parameters including attribute-threshold values and risk avoidance levels may be used to alter the determined agrochemical product to be applied to the application cells.

Still other land or soil attributes that may be used in our technologies include the location of drainage tiles in an application area, which in one embodiment may be based on or determined from a geographically-referenced map of the location of the drainage areas. In this embodiment, enhanced efficiency fertilizer is be placed over the top of a drainage tile to reduce immediate loss into drainage tile, and conventional fertilizer is placed between drainage tile. Furthermore, buffer areas can be established, for example if an application area is near a surface water resource, so that the enhanced efficiency fertilizer is placed in a buffer area nearer the water source and conventional fertilizer is placed away from the water resource.

In other embodiments, this variable-product application technology may be utilized to apply phosphorus in the presence or absence of a phosphorus stabilizer such as Avail in areas with clay mineralogy that fixates phosphorus, low vs. high soil wetness index to avoid loss and enhance efficiency, and based on soil-pH levels; to apply fertilizer catalysts, also called soil amendments (such as NutriLife MAX); and micronutrient applications, which can be impregnated, in one embodiment, can use soil pH and soil organic matter to delineate zones for application or zones for avoiding application.

Still another embodiment relates to fungicides: the wetness index may be utilized to indicate areas likely to have a higher incidence or severity of disease when applying preventative or curative fungicides. For example, a preventative fungicide can be applied to the entire field, while a curative fungicide is injected into the spray solution at certain locations in the field. This may be used as a foliar application, but also used as a possible seed treatment. Still another embodiment relates to herbicides. For example, in one embodiment herbicides such as the chloroacetamide, HPPD, and triazine families that are soil applied and/or have residual soil activity are used. These are generally sold as premixes; additional product(s) may be injected in areas where loss of residual activity is expected.

Our technology may be used to delineate areas of the field, based soil or land characteristics, and to determine and/or apply automatically different herbicide rates or herbicide sources. For example, Guardsman Max herbicide application rate for coarse soil is 2.5-3 pts/acre when there is less than 3% organic matter and 3-4 pts/acre when there is more than 3% organic matter, but in a medium or fine soil rates are 3-4 pts/acre when organic matter is <3% and 4-4.6 pts/acre when organic matter is >3%, which may increase efficacy, reduce runoff potential, differences in chemical and physical breakdown, leaching loss, and other environmental losses.

It will be understood that certain features and subcombinations are of utility and may be employed without reference to other features and subcombinations and are contemplated within the scope of the claims. Not all steps listed in the various figures need be carried out in the specific order described.

The invention claimed is:

1. Computer-readable media having computer-executable instructions embodied thereon that when executed, facilitate a method of applying fertilizer to a fertilizer application area that is made up of a plurality of discrete land units, the method comprising:
   determining an attribute value for each land unit that quantifies a degree to which the land unit possesses a certain characteristic, thereby resulting in a set of attribute values;
   delineating a first zone based on said set of attribute values, wherein said first zone is made up of land that shares substantially similar attribute values;
   from a set of fertilizer-application parameters, based on a subset of fertilizer-application parameters that relate to limitations of physically applying fertilizer to the land, logically partitioning said application area into a set of application cells ("application cells");
   (1) wherein at least a portion of said first zone falls within at least one application cell of said set of application cells; and
   (2) wherein said application cell encompasses a subset of the plurality of discrete land units, thereby resulting in a subset of attribute values that are associated with said application cell;
   receiving at least one fertilizer-application parameter from said set of application parameters;
   from among a number of fertilizer types, determining a product of fertilizer to be applied to said application cell based on said subset of attribute values and at least one fertilizer-application parameter; and
   generating controller information that is usable by a fertilizer applicator to apply fertilizer to said application cell consistent with said determined product of fertilizer;
   wherein said attribute value comprises a wetness-index value; wherein said at least one fertilizer-application parameter includes a wetness-index threshold; and further comprising:
   comparing said wetness-index threshold to at least one attribute value of said first zone;
   based on said comparison, designating said first zone for receiving a certain fertilizer type; wherein said product of fertilizer to be applied to said application cell is further determined based on said first-zone designation and said portion of said first zone falling within said application cell.

2. The computer-readable media of claim 1, wherein the length of said application cell is determined based on the location of said first zone.

3. The computer-readable media of claim 1, wherein said wetness-index value comprises a Topographic Wetness Index ("TWI") value.

4. The computer-readable media of claim 1, wherein said wetness-index is based on application-area variables operable for indicating relative spatial variability in wetness.

5. The computer-readable media of claim 4, wherein said application-area variables include at least one of the group comprising: vegetation, soil-structure, depth to impermeable layer, and residue cover.

6. The computer-readable media of claim 1, wherein said at least one fertilizer-application parameter includes a mixed-types parameter, for indicating whether said application-cell is permitted to receive an application of a single-fertilizer type or a mixture of fertilizer types.

7. The computer-readable media of claim 1, wherein said at least one fertilizer-application parameter further includes a mixed-types parameter, for indicating whether said application cell is permitted to receive an application of a single fertilizer type or a mixture of fertilizer types, and further comprising:
   delineating a second zone based on said set of attribute values,
   (1) wherein said second zone is made up of land that shares substantially similar attribute values that are different than said attribute values of said first zone, and
   (2) wherein at least a portion of said second zone falls within said application cell;
   comparing said wetness-index threshold to at least one attribute value of said second zone;
   based on said comparison, designating said second zone for receiving a certain fertilizer type;
   wherein said product of fertilizer to be applied to said application cell is further determined based on said mixed-types parameter, said second-zone designation, and said portion of said second zone falling within said application cell, such that:
   (1) said single-fertilizer type is said fertilizer type designated by the zone, from among said first and second zones, occupying the largest area within said application cell; and
   (2) said mixture of fertilizer types includes a mixed ratio of said fertilizer type designated by said first-zone and said fertilizer type designated by said second zone, wherein said mixed ratio is based on a proportion of said portions of said first and second zones within said application cell.

8. The computer-readable media of claim 1 wherein said at least one fertilizer-application parameter further includes a risk-avoidance level, and wherein said threshold is adjusted based on said risk-avoidance level.

9. The computer-readable media of claim 1, wherein said at least one fertilizer-application parameter is related to historical application information including previous yield information or previous fertilizer-application information.

10. The computer-readable media of claim 1, wherein said at least one fertilizer-application parameter is related to economic information.

11. The computer-readable media of claim 1, further comprising:
   generating a mapping of said application cell within said application area, wherein said mapping includes geographically referenced visual information representing said product of fertilizer applied to said application cell.

12. The computer-readable media of claim 11, wherein said mapping further includes geographically-referenced visual-information representing a subsequent crop-yield resulting from a fertilizer application based on said product.

13. Computer-readable media having computer-executable instructions embodied thereon that when executed, facilitate a method of managing application of fertilizer to an area made up of a plurality of location points of land, the method comprising:
   determining an attribute value, for each location point of said plurality of location points in an application area, that represents a degree to which said location point possesses a certain characteristic, thereby resulting in a set of attribute values;
   delineating a first zone based on said set of attribute values, wherein said first zone is made up of location points having attribute values belonging to a similar range of values;
   from a set of fertilizer-application parameters, based on a subset of fertilizer-application parameters that relate to limitations of physically applying fertilizer, logically partitioning said application area to define at least one application cell;
   (1) wherein at least a portion of said first zone falls within said at least one application cell; and
   (2) wherein said at least one application cell encompasses a subset of the plurality of location points, thereby resulting in a subset of attribute values that are associated with said at least one application cell;
   receiving at least one fertilizer-application parameter from said set of application parameters;
   from among a number of fertilizer types, determining an application schedule of fertilizer to be applied to said application cell based on said subset of attribute values and at least one fertilizer-application parameter; and
   generating controller-information that is usable by a fertilizer applicator to apply fertilizer to said application cell consistent with said determined application schedule;
   wherein said at least one fertilizer-application parameter includes an attribute-value threshold; and further comprising:
   comparing said attribute-value threshold to an attribute value representative of said first zone;
   based on said comparison, designating said first zone for receiving a certain fertilizer type; and wherein said application schedule of fertilizer to be applied to said application cell is further determined based on said first zone's designation and said portion of said first zone falling within said application cell.

14. The computer-readable media of claim 13 wherein said attribute-value threshold comprises a set of sub-thresholds, such that each sub-threshold defines one end of a range of attribute values.

15. The computer-readable media of claim 13, wherein said at least one fertilizer-application parameter further includes a parameter related to economic information.

16. The computer-readable media of claim 13, further comprising: generating a mapping of said application cell within said application area, wherein said mapping includes geographically referenced visual information representing said application schedule of fertilizer.

17. The computer-readable media of claim 16, wherein said mapping further includes geographically-referenced visual-information representing a subsequent crop-yield resulting from a fertilizer application based on said product.

18. The computer-readable media of claim 13 wherein said at least one fertilizer-application parameter further includes a risk-avoidance level, and wherein said threshold is adjusted based on said risk-avoidance level.

19. Computer-readable media having computer-executable instructions embodied thereon that when executed, facilitate a method of applying fertilizer to an area that is made up of a plurality of discrete land units, the method comprising:

determining a value of a wetness index for each land unit thereby resulting in a set of wetness-index values;

delineating a first zone of ground based on said wetness-index values, wherein said first zone is substantially made up of ground having wetness-index values of a similar range within said wetness index;

based on a subset of fertilizer-application parameters that relate to limitations of physically applying fertilizer to ground, logically partitioning said application area to define an application cell;
(1) wherein at least a portion of said first zone falls within said application cell; and
(2) wherein said application cell encompasses a subset of the plurality of discrete land units, thereby resulting in a subset of wetness-index values associated with said application cell;

receiving at least one fertilizer-application parameter including a wetness-index threshold;

comparing said wetness-index threshold to a value representing said wetness-index values of said portion of said first zone within said application cell;

based on said comparison, designating said first zone for receiving an enhanced-type fertilizer or a conventional-type fertilizer;

from among a number of fertilizer types, determining a product of fertilizer to be applied to said application cell based on said subset of wetness index values and said first-zone designation; and generating controller information that is usable by a fertilizer applicator to apply fertilizer to said application cell consistent with said determined product of fertilizer.

20. The computer-readable media of claim 19, wherein said at least one fertilizer-application parameter further includes a mixed-types parameter, for specifying whether said application cell is permitted to receive an application of a single fertilizer type or a mixture of fertilizer types; further comprising:

delineating a second zone of ground based on said wetness-index values,
(1) wherein said second zone is substantially made up of ground having wetness-index values of a similar range within said wetness index that is different than said range of wetness-index values of said first zone; and
(2) wherein at least a portion of said second zone falls within said application cell;

comparing said wetness-index threshold to a value representing said wetness-index values of said portion of said second zone within said application cell; and based on said comparison, designating said second zone for receiving an enhanced-type fertilizer or a conventional-type fertilizer;

wherein said product of fertilizer to be applied to said application cell is further determined based on said mixed-types parameter, said second-zone designation, and said portion of said second zone falling within said application cell, such that:
(1) said single-fertilizer type is said fertilizer type designated by the zone, from among said first and second zones, occupying the largest area within said application cell; and
(2) said mixture of fertilizer types includes a mixed ratio of said fertilizer type designated by said first-zone and said fertilizer type designated by said second zone, wherein said mixed ratio is based on a proportion of said portions of said first and second zones within said application cell.

* * * * *